(12) United States Patent
Ichihashi et al.

(10) Patent No.: US 8,259,259 B2
(45) Date of Patent: Sep. 4, 2012

(54) LIQUID CRYSTAL DISPLAY DEVICE COMPRISING AN OPTICALLY ANISOTROPIC FILM HAVING AT LEAST ONE SPECIES OF LIQUID CRYSTAL COMPOUND WHICH EXHIBITS A NEMATIC PHASE OR A SMECTIC PHASE

(75) Inventors: Mitsuyoshi Ichihashi, Minami-ashigara (JP); Shinichi Morishima, Minami-ashigara (JP); Hiroshi Takeuchi, Minami-ashigara (JP)

(73) Assignee: FUJIFILM Corporation, Minato-Ku, Tokyo (JP)

(*) Notice: Subject to any disclaimer, the term of this patent is extended or adjusted under 35 U.S.C. 154(b) by 413 days.

(21) Appl. No.: 12/595,438

(22) PCT Filed: Apr. 11, 2008

(86) PCT No.: PCT/JP2008/000954
§ 371 (c)(1),
(2), (4) Date: Oct. 9, 2009

(87) PCT Pub. No.: WO2008/126421
PCT Pub. Date: Oct. 23, 2008

(65) Prior Publication Data
US 2010/0157204 A1     Jun. 24, 2010

(30) Foreign Application Priority Data
Apr. 11, 2007   (JP) ................. 2007-103705

(51) Int. Cl.
G02F 1/1347     (2006.01)
G02F 1/1337     (2006.01)
(52) U.S. Cl. ............... 349/75; 349/76; 349/127

(58) Field of Classification Search ............ 349/33, 349/34, 75, 76, 69, 99, 113–115, 123, 127, 349/128, 134–136
See application file for complete search history.

(56) References Cited

U.S. PATENT DOCUMENTS

| 2001/0055082 | A1 | 12/2001 | Kubo et al. |
| 2002/0097362 | A1* | 7/2002 | Yamada et al. ............... 349/130 |
| 2004/0004681 | A1* | 1/2004 | Ozawa et al. ................. 349/61 |

FOREIGN PATENT DOCUMENTS

| JP | 2000-29010 A | 1/2000 |
| JP | 2000-35570 A | 2/2000 |
| JP | 2002-31717 A | 1/2002 |
| JP | 2003-322857 A | 11/2003 |
| JP | 2004-38205 A | 2/2004 |

(Continued)

OTHER PUBLICATIONS

International Search Report (PCT/ISA/210) dated Jul. 10, 2008.

(Continued)

*Primary Examiner* — Brian M. Healy
*Assistant Examiner* — Paul Lee
(74) *Attorney, Agent, or Firm* — Buchanan Ingersoll & Rooney PC

(57) ABSTRACT

An optically anisotropic film comprising at least one species of liquid crystal compound which exhibits a nematic phase or a smectic phase, the liquid crystal phase showing birefringence $\Delta n(\lambda)$ at wavelength $\lambda$ which satisfies the numerical expression (1) below is disclosed.

$$\Delta n(450\ nm)/\Delta n(550\ nm) < 1 \qquad (1)$$

13 Claims, 1 Drawing Sheet

FOREIGN PATENT DOCUMENTS

| | | | |
|---|---|---|---|
| JP | 2004-145327 A | 5/2004 | |
| JP | 2004-157453 A | 6/2004 | |
| JP | 2004-219553 A | 8/2004 | |
| JP | 2004-226829 A | 8/2004 | |
| JP | 2004-226830 A | 8/2004 | |
| JP | 2005-62670 A | 3/2005 | |
| JP | 2005-62672 A | 3/2005 | |
| JP | 2005-242031 A | 9/2005 | |
| JP | 2005-283850 A | 10/2005 | |
| JP | 2005-283851 A | 10/2005 | |
| JP | 2007-31709 A | 2/2007 | |
| WO | WO 2006107061 A1 * | 10/2006 | |
| WO | WO 2007024002 A1 * | 3/2007 | |
| WO | WO 2007064029 A1 * | 6/2007 | |
| WO | WO 2008072794 A1 * | 6/2008 | |

OTHER PUBLICATIONS

Written Opinion (PCT/ISA/237) dated Jul. 22, 2008.
Notification Concerning Transmittal of International Preliminary Report on Patentability (Forms PCT/IB/326 and PCT/IB/373) and the Written Opinion of the International Searching Authority (Form PCT/ISA/237) issued in corresponding International Application No. PCT/JP2008/000954 dated Oct. 22, 2009, and it's English Translation (Forms PCT/IB/338, PCT/IB/373 and PCT/ISA/237).

* cited by examiner

LIQUID CRYSTAL DISPLAY DEVICE COMPRISING AN OPTICALLY ANISOTROPIC FILM HAVING AT LEAST ONE SPECIES OF LIQUID CRYSTAL COMPOUND WHICH EXHIBITS A NEMATIC PHASE OR A SMECTIC PHASE

TECHNICAL FIELD

The present invention relates to a liquid crystal display device such as those of reflective/transmissive type, and semi-transmissive type used for various display devices including those adoptable to various OA equipment, portable gaming devices, mobile phones and portable digital assistants, and an optically anisotropic film used for optical compensation of the liquid crystal display device.

BACKGROUND ART

Liquid crystal display device is roughly classified into three types which include those of transmissive type allowing image display based on a transmissive mode, those of reflective type allowing image display based on a reflective mode, and those of reflective/transmissive type allowing image display based on both of the transmissive mode and reflective mode, and have been widely disseminated as display devices for notebook-type personal computers, television sets and so forth, by virtue of their thin and light-weight features. In particular, the reflective/transmissive-type liquid crystal display device, which adopts features of the reflective type and transmissive type, and is capable of switching over both modes depending on brightness of environment, has been adopted to various portable electronic appliances, by virtue of its advantage in that it can provides clear display even in dark places, while saving the power consumption.

A basic configuration of the reflective/transmissive-type liquid crystal display device is disclosed, for example, in Patent documents 1 and 2.

The reflective/transmissive-type liquid crystal display device needs a larger number of retardation layers as compared with the reflective-type liquid crystal display device and the transmissive-type liquid crystal display device, and consequently raises non-conformities including increase in the cost, and increase in the thickness of the display cell. In addition, due to performances of retardation plates adopted thereto, including λ/4 plate and λ/2 plate, not satisfied over the entire range of the visible light region, there have been known problems in viewing angle characteristics, such as undesirable coloration, narrow angle of viewing in the transmissive mode, and so forth.

Aiming at expanding the viewing angle for ensuring good contrast in display based on the transmissive mode, there have been proposed methods of using an optical compensation film having a nematic hybrid alignment fixed thereon, for a λ/4 layer in the retardation film on the upper and lower sides of a panel, or on one side of the panel, and have partially been put into practical use. The methods are disclosed in Patent documents 3-6, for example.

Aiming at reducing the number of retardation plates, there has been proposed also a method of disposing a retardation film in the reflective area inside the panel (Patent document 7). For the purpose of improving luminance in the transmissive mode, particularly improving peak luminance, there have been proposed still also methods of similarly disposing a retardation film in a reflective area inside the panel (Patent documents 8-15). For the purpose of similarly improving the peak luminance, there has been proposed still also a method of disposing a retardation film in a transmissive area inside the panel (Patent document 15). However, it has been very difficult for these methods to ensure uniformity in the manufacturing and to reduce scattering of light. It has also been difficult to achieve widening the viewing angle for ensuring good contrast and good efficiency of use of light at the same time in the transmissive mode.

Patent document 1: Japanese Laid-Open Patent Publication No. 2000-29010
Patent document 2: Japanese Laid-Open Patent Publication No. 2000-35570
Patent document 3: Japanese Laid-Open Patent Publication No. 2002-31717
Patent document 4: Japanese Laid-Open Patent Publication No. 2004-157453
Patent document 5: Japanese Laid-Open Patent Publication No. 2005-62672
Patent document 6: Japanese Laid-Open Patent Publication No. 2005-62670
Patent document 7: Japanese Laid-Open Patent Publication No. 2003-322857
Patent document 8: Japanese Laid-Open Patent Publication No. 2004-38205
Patent document 9: Japanese Laid-Open Patent Publication No. 2004-219553
Patent document 10: Japanese Laid-Open Patent Publication No. 2004-226829
Patent document 11: Japanese Laid-Open Patent Publication No. 2004-226830
Patent document 12: Japanese Laid-Open Patent Publication No. 2005-242031
Patent document 13: Japanese Laid-Open Patent Publication No. 2005-283850
Patent document 1:4 Japanese Laid-Open Patent Publication No. 2005-283851
Patent document 15: Japanese Laid-Open Patent Publication No. 2004-145327

SUMMARY OF THE INVENTION

Problems to be Resolved by the Invention

It is therefore an object of the present invention to provide a novel optically anisotropic film which is contributive to improvement in the viewing angle characteristics of liquid crystal display device, in particular reflective/transmissive-type liquid crystal display devices, and is capable of being readily prepared.

It is another object of the present invention to provide a liquid crystal display device which allows high-brightness, wide-viewing-angle display, and is capable of being readily produced.

Means for Solving the Problems

The means for solving the above mentioned problems are as follows.

[1] An optically anisotropic film comprising at least one species of liquid crystal compound which exhibits a nematic phase or a smectic phase, the liquid crystal phase showing birefringence $\Delta n(\lambda)$ at wavelength $\lambda$ which satisfies the numerical expression (1) below $$\Delta n(450 \text{ nm})/\Delta n(550 \text{ nm}) < 1 \tag{1}$$

wherein molecules of the liquid crystal compound are fixed in a state of tilted alignment in the optically anisotropic film.

[2] The optically anisotropic film of claim [1], wherein the tilt angles of molecules of the liquid crystal compound on the upper surface and on the lower surface of the film are different from each other; and a mean tilt angle of molecules of the liquid crystal compound is from 5° to 85°.

[3] The optically anisotropic film of [1], wherein the tilt angles of molecules of the liquid crystal compound on the upper surface and on the lower surface of the film are same; and a mean tilt angle of molecules of the liquid crystal compound is from 5° to 85°.

[4] The optically anisotropic film of any one of [1] to [3], wherein the liquid crystal compound is a compound represented by the formula (I) below:

[Formula 1]

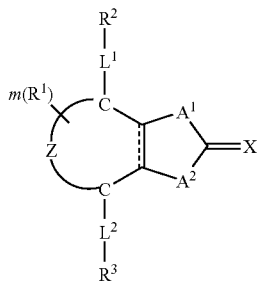

Formula (I)

where, each of $A^1$ and $A^2$ independently represents a group selected from the group consisting of —O—, —NR— (R represents a hydrogen atom or substituent), —S— and —CO—; Z represents one or two atoms selected from the group consisting of carbon atom, and the Group XIV to XVI non-metallic atoms, and forms a five- or six-membered ring together with C—C=C—C or C=C—C=C in the formula; each of $R^1$, $R^2$ and $R^3$ independently represents a substituent; m represents an integer from 0 to 4; each of $L^1$ and $L^2$ independently represents a single bond or divalent linking group; X represents any of the Group XIV to XVI non-metallic atoms, to which a hydrogen atom or substituent $R^4$ may be bound; and at least one of R, $R^1$, $R^2$, $R^3$ and $R^4$ has a polymerizable group.

[5] The optically anisotropic film of [4], wherein the compound represented by formula (I) is a compound represented by formula (II) below:

[Formula 2]

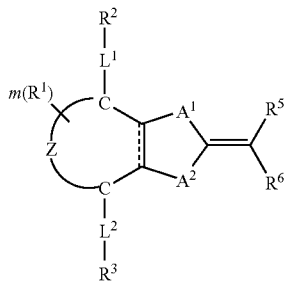

Formula (II)

where, each of $A^1$ and $A^2$ independently represents a group selected from the group consisting of —O—, —NR— (R represents a hydrogen atom or substituent), —S— and —CO—; Z represents one or two atoms selected from the group consisting of carbon atom and the Group XIV to XVI non-metallic atoms, and forms a five- or six-membered ring together with C—C=C—C or C=C—C=C in the formula; each of $R^1$, $R^2$ and $R^3$ independently represents a substituent; m represents an integer from 0 to 4; each of $L^1$ and $L^2$ independently represents a single bond or divalent linking group; each of $R^5$ and $R^6$ independently represents a substituent, and at least one of R, $R^1$, $R^2$, $R^3$, $R^5$ and $R^6$ has a polymerizable group.

[6] The optically anisotropic film of any one of [1] to [5], having retardation in plane, Re, at a wavelength of 550 nm, of 80 to 160 nm.

[7] The optically anisotropic film of any one of [1] to [6], formed by jetting a fluid, which comprises at least the liquid crystal compound, from an ink-jet-type jetting head onto a surface, drying the fluid to form a liquid crystal phase, and by subjecting the resultant film to light exposure.

[8] A liquid crystal display device comprising a first optically anisotropic layer which is an optically anisotropic film of any one of [1] to [7], a back light, a polarizing layer, and a liquid crystal cell which comprises a pair of substrates and a liquid crystal layer held therebetween, and has a reflective area and a transmissive area formed therein.

[9] The liquid crystal display device of [8], wherein the first optically anisotropic layer is disposed between the polarizing layer and either one of the pair of substrates.

[10] The liquid crystal display device of [8], wherein the first optically anisotropic layer is disposed between the pair of substrates.

[11] The liquid crystal display device of [9] or [10], further comprising a second optically anisotropic layer having retardation along the thickness direction, Rth, measured at 550 nm of 40 nm to 150 nm, and retardation in plane Re measured at 550 nm of 0 nm to 20 nm, wherein
the second optically anisotropic layer is disposed between the liquid crystal layer and the first optically anisotropic layer, or
the second optically anisotropic layer is disposed so that the liquid crystal layer is held by the second optically anisotropic layer and the first optically anisotropic layer.

[12] The liquid crystal display device of [11], wherein Rth of the second optically anisotropic layer shows regular wavelength dispersion characteristics.

[13] The liquid crystal display device of any one of [8] to [12], wherein the liquid crystal layer shows a larger tilt angle in the black state than in the white state.

[14] The liquid crystal display device of any one of [8] to [13], wherein a mean direction of axis of directors of liquid crystal molecules in the liquid crystal layer in the black state, projected onto a plane parallel to the layer, is substantially parallel to the direction of director of molecules of the liquid crystal compound in the first optically anisotropic layer, projected onto the plane parallel to the layer.

Effect of the Invention

According to the invention, it is possible to provide a novel optically anisotropic film which is contributive to improvement in the viewing angle characteristics of liquid crystal display device, in particular reflective/transmissive-type liquid crystal display devices, and is capable of being readily prepared.

According to the invention, it is also possible to provide a liquid crystal display device which allows high-brightness, wide-viewing-angle display, and is capable of being readily produced.

EMBODIMENTS OF THE INVENTION

The present invention will be detailed below. Note that explanation of the constituents given below may be made based on representative embodiments of the present invention, without limiting the present invention. Note also that any numerical range expressed using "to" in this specification means a range including the numerals placed before and after "to" as the lower limit value and the upper limit value, respectively. It is defined also that "orthogonal" and "parallel" with respect to angle mean ranges expressed by precise angle±10°, and "equal" and "different" with respect to angle may be judged based on a criterion that whether the difference is smaller than 5° or not.

In the present invention, "angle of inclination (tilt angle)" means an angle formed by an inclined liquid crystal molecule and the plane of layer, and more specifically means a largest angle out of angles formed in a refractive index ellipsoid of the liquid crystalline compound, formed by the direction of maximum refractive index and the plane of layer. Accordingly, as for a rod-like liquid crystalline compound having a positive optical anisotropy, the tilt angle means an angle formed by the longitudinal direction of the rod-like liquid crystalline compound, or the direction of director, and the plane of layer. In the present invention, the "mean tilt angle" means an average value of tilt angles observed at the upper interface and lower interface of the retardation layer. Accordingly, the mean tilt angle coincides with the tilt angles at the upper interface and lower interface in a uniformly inclined alignment, and coincides with the middle value between the tilt angles observed at the upper interface and lower interface in a hybrid alignment.

In this description, $Re(\lambda)$ and $Rth(\lambda)$ are retardation in plane (nm) and retardation along the thickness direction (nm), respectively, at a wavelength of $\lambda$. $Re(\lambda)$ is measured by applying light having a wavelength of $\lambda$ nm to a sample such as a film in the normal direction thereof, using KOBRA 21ADH or WR (by Oji Scientific Instruments).

When a sample to be analyze by a monoaxial or biaxial index ellipsoid, $Rth(\lambda)$ of the film is calculated as follows. The selectivity of the measurement wavelength 2 nm may be conducted by a manual exchange of a wavelength-filter, a program conversion of a measurement wavelength value or the like.

$Rth(\lambda)$ is calculated by KOBRA 21ADH or WR based on six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an tilt axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain tilt angle, around the in-plane slow axis from the normal direction as the rotation axis, then the retardation value at the tilt angle larger than the tilt angle to give a zero retardation is changed to negative data, and then the $Rth(\lambda)$ of the film is calculated by KOBRA 21ADH or WR.

Around the slow axis as the tilt angle (rotation angle) of the film (when the film does not have a slow axis, then its rotation axis may be in any in-plane direction of the film), the retardation values are measured in any desired tilted two directions, and based on the data, and the estimated value of the mean refractive index and the inputted film thickness value, Rth may be calculated according to the following numerical formulae (7) and (8):

[Numerical formula 1]

$$Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}^2} \quad \text{Numerical formula (11)}$$

[Numerical formula 2]

$$Rth = \left[\frac{nx + ny}{2} - nz\right] \times d \quad \text{Numerical formula (12)}$$

In the formulae, $Re(\theta)$ represents a retardation value in the direction tilted by an angle $\theta$ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the sample.

When the sample such as a film to be analyzed is not expressed by a monoaxial or biaxial index ellipsoid, or that is, when the film does not have an optical axis, then $Rth(\lambda)$ of the film may be calculated as follows:

$Re(\lambda)$ of the film is measured around the slow axis (judged by KOBRA 21ADH or WR) as the in-plane tilt axis (rotation axis), relative to the normal direction of the film from –50 degrees up to +50 degrees at intervals of 10 degrees, in 11 points in all with a light having a wavelength of $\lambda$ nm applied in the tilted direction; and based on the thus-measured retardation values, the estimated value of the mean refractive index and the inputted film thickness value, $Rth(\lambda)$ of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some major optical films are listed below:

cellulose acylate (1.48), cycloolefin polymer (1.52), polycarbonate (1.59), polymethylmethacrylate (1.49) and polystyrene (1.59).

KOBRA 21ADH or WR calculates nx, ny and nz, upon enter of the hypothetical values of these mean refractive indices and the film thickness. Base on thus-calculated nx, ny and nz, $Nz=(nx-nz)/(nx-ny)$ is further calculated.

[Optically Anisotropic Film]

The present invention relates to an optically anisotropic film which contains at least one species of liquid crystal compound which exhibits a nematic phase or a smectic phase, wherein the liquid crystal phase shows a birefringence $\Delta n(\lambda)$ at wavelength $\lambda$ which satisfies the mathematical expression (1) below:

$$\Delta n(450 \text{ nm})/\Delta n(550 \text{ nm}) < 1 \quad (1).$$

In the optically anisotropic film, the molecules of the liquid crystal compound are fixed in a state of tilted alignment. The state of tilted alignment may roughly be classified into hybrid alignment showing different angles of inclination (tilt angles) of the liquid crystalline compound at around the upper interface and at around the lower interface, and monoaxially tilted alignment showing a nearly same tilt angles at around the upper interface and at around the lower interface. The optically anisotropic film of the present invention may be formed by fixing any of these states of tilted alignment. The hybrid alignment shows a difference of tilt angle of 5° or larger, when compared between at around the upper interface and at around the lower interface. The tilt angle preferably varies in a continuous manner from the upper interface towards the lower interface. For the case where the optically anisotropic film is formed on the surface of a substrate such as a polymer film, glass plate or the like, possible modes of hybrid alignment include a mode in which the tilt angle increases from the surface of the film closer to the substrate towards the surface of the film distant from the substrate, and a mode in which the tilt angle decreases from the surface of the film closer to the substrate towards the surface of the film distant from the substrate. Both modes may be adoptable.

In view of fully expressing optical compensation performance, the optically anisotropic film of the present invention preferably has a mean tilt angle of liquid crystal compound molecules of 5° to 85° on the absolute value basis, more preferably 15° to 55°, and still more preferably 20° to 45°. The mean tilt angle may be determined by applying the crystal rotation method. In the optically anisotropic film based on the hybrid alignment, the director of the liquid crystalline compound molecules lies in different direction at every point in the thickness-wise direction of the layer, so that the optically anisotropic film, when viewed as a structural body, has no optical axis.

The optically anisotropic film may be prepared by allowing a nematic liquid crystal to align in an inclined manner, while making the mean tilt angle fall in the above-described range, and by fixing the liquid crystal to the obtained state of alignment. So far as the above-described conditions could be satisfied, the optically anisotropic film may be composed of any species of materials, without limiting modes of fixation. A typical method of preparing may be as follows. A low-molecular-weight liquid crystal is aligned obliquely; and the alignment is fixed by photo-crosslinking or thermal crosslinking. Alternative method may be as follows. A high-molecular-weight liquid crystal is aligned obliquely, and the alignment is fixed by cooling.

Still alternatively, the optically anisotropic film may be prepared also by fixing a smectic liquid crystal. When the smectic liquid crystal is used, first the smectic liquid crystal is allowed to horizontally and uniformly align, and then allowed to cause alignment transition to hybrid alignment through fixation by photo-crosslinking or thermal crosslinking. A supposed mechanism of achieving the hybrid alignment may be such that narrowing of the inter-layer distance of smectic layers, due to polymerization shrinkage, induces focalconic strain, and the strain further induces distortion and inclination of the smectic layers to give the hybrid alignment. Accordingly, the tilt angle may be controlled by appropriately controlling the ratio of polymerization shrinkage or the rate of progress of polymerization. The smectic liquid crystal may more preferably be adoptable to applications in need of a relatively large retardation of 100 nm or larger, because the optically anisotropic film composed thereof shows only a small scattering of depolarized light ascribable to orientational fluctuation. The smectic phase may be any of SmA, SmB, SmC or those of higher orders, without special limitation.

The thickness of the optically anisotropic film is preferably from 0.1 to 20 μm, more preferably from 0.2 to 15 μm, and still more preferably from 0.3 to 10 μm. Retardation in plane at 550 nm, Re(550 nm), of the optically anisotropic film generally falls in the range from 10 nm to 250 nm, while preferable ranges of which may vary depending on applications.

[Liquid Crystal Compound Used for Preparation of Optically Anisotropic Film]

In preparing the optically anisotropic film, at least one species of liquid crystal compound which exhibits a nematic phase or a smectic phase is used, wherein the liquid crystal phase shows reversed wavelength dispersion characteristics of birefringence $\Delta n(\lambda)$ at wavelength $\lambda$, or that is, characteristics wherein birefringence is larger at longer wavelength region, at least over the range from 450 to 550 nm (preferably over the entire range of visible light region). More specifically, at least one species of liquid crystal compound which satisfies numerical expression (1) below is used.

$$\Delta n(450 \text{ nm})/\Delta n(550 \text{ nm}) < 1 \quad \text{Numerical expression (1)}$$

While the wavelength dispersion characteristics of birefringence of the liquid crystal compound hardly depends on temperature in the same liquid crystal phase, it is defined herein for clear understanding of the present invention that $\Delta n(450 \text{ nm})$ and $\Delta n(550 \text{ nm})$, which are measured at temperature lower by 20° C. than the upper limit temperature at which transition to another phase would occur, satisfy numerical expression (1). For the case where the temperature range over which the liquid crystal phase may appear resides at or under 20° C., $\Delta n(450 \text{ nm})$ and $\Delta n(550 \text{ nm})$ are defined to be measured at a temperature lower by 10° C. than the upper limit temperature of the liquid crystal phase. For the case where the temperature range over which the liquid crystal phase may appear resides at or under 10° C., the values are defined to be measured at a temperature lower by 5° C. than the upper limit temperature of the liquid crystal phase. For the case where the temperature range over which the liquid crystal phase may appear resides at or under 5° C., the values are defined to be measured at a temperature lower by 2° C. than the upper limit temperature of the liquid crystal phase.

The preferable range of wavelength dispersion characteristics of $\Delta n$ of the liquid crystal compound cannot unequivocally be determined since it varies depending on applications, but $\Delta n$ of the liquid crystal compound preferably satisfies numerical expressions (2) and (3) below, when the liquid crystal compound is used for compensation of viewing angle of reflective/transmissive-type liquid crystal display device described later:

$$0.60 < \Delta n(450 \text{ nm})/\Delta n(550 \text{ nm}) < 0.99; \text{ and} \quad \text{Numerical expression (2)}$$

$$1.01 < \Delta n(650 \text{ nm})/\Delta n(550 \text{ nm}) < 1.35. \quad \text{Numerical expression (3)}$$

In the numerical expressions (1), (2) and (3), $\Delta n(450)$, $\Delta n(550)$ and $\Delta n(650)$ represent $\Delta n$ measured at 450 nm, 550 nm and 650 nm, respectively. Note that each measurement wavelength contains an error of ±10 nm.

Methods of measuring $\Delta n$ of liquid crystal may be exemplified by a method of using a wedge-form liquid crystal cell, such as described in "Ekisho Binran (The Handbook of Liquid Crystals)" 2.4.13 (published by Maruzen Co., Ltd., 2000). In this method, three types of band-pass filters transmissive at 450 nm, 550 nm and 650 nm are used to determine $\Delta n$ at the individual wavelengths. For the case where the liquid crystal compound has a polymerizable group, the measurement may occasionally be difficult due to polymerization reaction possibly proceeds in the wedge-form liquid crystal cell. In this case, the measurement may preferably be proceeded by adding a polymerization inhibitor. Alternatively, Δn of liquid crystal, while being kept in a uniformly aligned manner, may be determined also by finding Re at the individual wavelengths using an instrument capable of measuring retardation, such as KOBRA (trade name, from Oji Scientific Instruments), and by separately measuring the film thickness d (based on the equation Δn=Re/d).

Examples of the liquid crystal compound used for preparing the optically anisotropic film include compounds represented by formula (I).

[Formula 3]

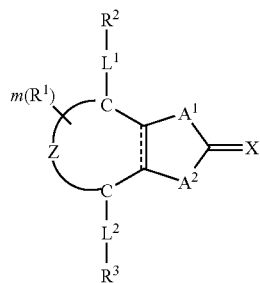

Formula (I)

In the formula, each of $A^1$ and $A^2$ independently represents a group selected from the group consisting of —O—, —NR— (R represents a hydrogen atom or substituent), —S— and —CO—; Z represents one or two atoms selected from the group consisting of carbon atom, and the Group XIV to XVI non-metallic atoms, and forms a five- or six-membered ring together with C—C=C—C or C=C—C=C in the formula; each of $R^1$, $R^2$ and $R^3$ independently represents a substituent; m represents an integer from 0 to 4; each of $L^1$ and $L^2$ independently represents a single bond or divalent linking group; X represents any of the Group XIV to XVI non-metallic atoms, to which a hydrogen atom or substituent $R^4$ may be bound; and at least one of R, $R^1$, $R^2$, $R^3$ and $R^4$ has a polymerizable group.

Among the compounds represented by formula (I), the compounds represented by formula (II) are preferable.

[Formula 4]

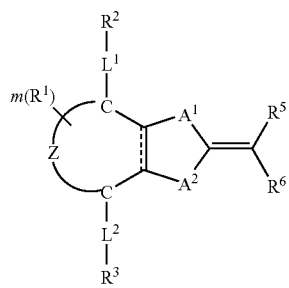

Formula (II)

In the formula, $A^1$, $A^2$, Z, $R^1$, $R^2$, $R^3$, m, $L^1$ and $L^2$ are same as those in formula (I) respectively. $R^5$ and $R^6$ each independently represent a substituent. It is to be noted that at least one of R, $R^1$, $R^2$, $R^3$, $R^5$ and $R^6$ has a polymerizable group.

The divalent linking group represented by $L^1$ or $L^2$ is not limited. Preferable examples of the divalent group include those shown below. Regarding the binding position, the binding position to the five or six membered ring, which is formed by Z and C—C=C—C or C=C—C=C, is the left terminal of each of the divalent linking groups shown below.

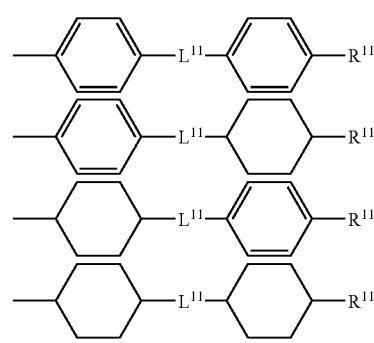

[Formula 5]

More preferable are —O—, —COO— and —OCO—.

In formula (I) or (II), Z represents one or two atoms selected from the group consisting of carbon atom, and the Group XIV to XVI non-metallic atoms, and forms a five- or six-membered ring together with C—C=C—C or C=C—C=C in the formula. The five- or six-membered ring, which is formed by Z and C—C=C—C or C=C—C=C is not limited; and preferable examples of the ring include those shown below. In the examples shown below, the dashed line indicates connecting to $L^1$ or $L^2$.

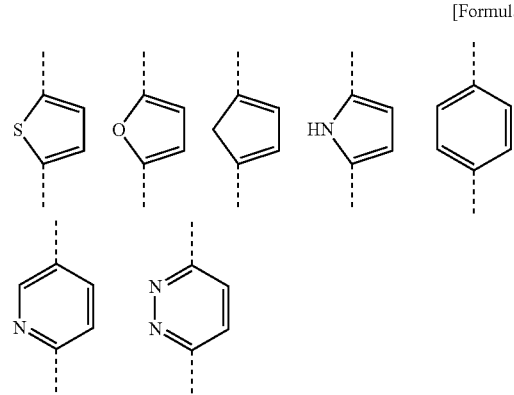

[Formula 6]

The ring formed by Z and C—C=C—C or C=C—C=C is preferably a six-membered ring. Containing a six-membered ring, the compound can be aligned with a higher order parameter. Because of the same reason, aromatic rings are preferable. Aromatic six-membered ring is more preferable.

In terms of the above mentioned matters and the synthesis, the ring formed by Z and C—C=C—C or C=C—C=C is preferably thiophene ring, benzene ring and pyridine ring, and is more preferably benzene ring.

In formula (I) or (II), $R^1$ represents a substituent; and if there are plural $R^1$, they may be same or different from each other or may form a ring. Examples of the substituent include:

halogen atoms (such as fluorine atom, chlorine atom, bromine atom and iodine atom), alkyl group (preferably linear or branched substituted or non-substituted $C_{1-30}$ alkyl group such as methyl, ethyl, n-propyl, isopropyl, tert-butyl, n-octyl and 2-ethyl hexyl); cycloalkyl group (preferably substituted or non-substituted $C_{3-30}$ cycloalkyl group such as cyclohexyl, cyclopentyl and 4-n-dodecyl cyclohexyl); bicycloalkyl group (preferably substituted or non-substituted $C_{5-30}$ bicycloalkyl group, that is, a monovalent residue of $C_{5-30}$ bicycloalkane from which a hydrogen atom is eliminated group, such as bicyclo[1,2,2]heptane-2-yl and bicyclo[2,2,2]octane-3-yl);

alkenyl group (preferably substituted or non-substituted $C_{2-30}$ alkenyl group such as vinyl and allyl); cycloalkenyl group (preferably substituted or non-substituted $C_{3-30}$ cycloalkenyl group, that is, a monovalent residue of $C_{3-30}$ cycloalkene such as 2-cyclopentene-1-yl and 2-cyclohexene-1-yl); bicycloalkenyl group (preferably substitute or non-substituted $C_{5-30}$ bicycloalkenyl group, that is, a monovalent residue of bicycloalkene having a double bonding from which a hydrogen atom is eliminated, such as bicyclo[2,2,1]hepto-2-en-1-yl and bicyclo[2,2,2]octo-2-en-4-yl); alkynyl group (preferably substituted or non-substituted $C_{2-30}$ alkynyl group such as ethynyl and propargyl);

aryl group (preferably substituted or non-substituted $C_{6-30}$ aryl group such as phenyl, p-tolyl and naphthyl); heterocyclic group (preferably a monovalent residue of a substituted or non-substituted, five- or six-membered, aromatic or non-aromatic heterocyclic compound from which a hydrogen atom is eliminated; and more preferably five- or six-membered $C_{3-30}$ heterocyclic group such as 2-furyl, 2-thienyl, 2-pyrimidyl and 2-benzothiazolyl); cyano group, hydroxyl group, nitro group, carboxyl group, alkoxy group (preferably substituted or non-substituted $C_{1-30}$ alkoxy group such as methoxy, ethoxy, isopropoxy, tert-butoxy, n-octyloxy, and 2-methoxy ethoxy); aryloxy group (preferably substituted or non-substituted $C_{6-30}$ aryloxy group such as phenoxy, 2-methyl phenoxy, 4-tert-butyl phenoxy, 3-nitro phenoxy and 2-tetradecanoylaminophenoxy);

silyloxy group (preferably $C_{3-20}$ silyloxy group such as trimethyl silyloxy and tert-butyl dimethyl silyloxy); heterocyclic oxy group (preferably substituted or non-substituted $C_{2-30}$ heterocyclic oxy group such as 1-phenyl tetrazole-5-oxy and 2-tetrahydro pyranyloxy); acyloxy group (preferably formyl oxy, substituted or non-substituted $C_{2-20}$ alkyl carbonyloxy group and substituted or non-substituted aryl carbonyloxy group $C_{6-30}$ such as formyl oxy, acetyl oxy, pivaloyl oxy, stearoyl oxy, benzoyl oxy and p-methoxy phenyl carbonyloxy); carbamoyl oxy group (preferably substituted or non-substituted $C_{1-30}$ carbamoyl oxy group such as N,N-dimethyl carbamoyl oxy, N,N-diethyl carbamoyl oxy, morpholino carbonyl oxy and N,N-di-n-octyl amino carbonyl oxy); alkoxycarbonyl oxy (preferably substituted or non-substituted $C_{2-30}$ alkoxycarbonyl oxy such as methoxy carbonyl oxy, ethoxy carbonyl oxy, tert-butoxy carbonyl oxy and n-octyl carbonyl oxy); aryloxy carbonyl oxy group (preferably substituted or non-substituted $C_{7-30}$ aryloxy carbonyl oxy group such as phenoxy carbonyl oxy, p-methoxy phenoxy carbonyl oxy and p-n-hexadecyloxy phenoxy carbonyl oxy);

amino group (preferably amino, substituted or non-substituted $C_{1-30}$ alkyl amino and substituted or non-substituted $C_{6-30}$ anilino group such as amino, methyl amino, dimethyl amino, aniline, N-methyl-anilino and diphenyl amino); acyl amino group (preferably formyl, substituted or non-substituted C1-30 alkylcarbonyl amino group, and substituted or non-substituted $C_{6-30}$ arylcarbonyl amino group such as formyl amino, acetyl amino, pivaloyl amino, lauroyl amino and benzoyl amino); aminocarbonyl amino group (preferably substituted or non-substituted $C_{1-30}$ aminocarbonyl amino group such as carbamoyl amino, N,N-dimethylamino carbonyl amino, N,N-diethylaminocarbonyl amino and morpholinocarbonyl amino); alkoxycarbonyl amino group (preferably $C_{2-30}$ substituted or non-substituted alkoxycarbonyl amino group such as methoxycarbonyl amino, ethoxycarbonyl amino, tert-butoxycarbonyl amino, n-octadecyloxycarbonyl amino and N-methyl-methoxycarbonyl amino); aryloxycarbonyl amino group (preferably $C_{7-30}$ substituted or non-substituted aryloxycarbonyl amino group such as phenoxycarbonyl amino, p-chlorophenoxycarbonyl amino and m-n-octyloxy phenoxycarbonyl amino);

sulfamoyl amino group (preferably substituted or non-substituted $C_{0-30}$ sulfamoyl amino group such as sulfamoyl amino, N,N-dimethyl amino sulfonylamino and N-n-octylamino sulfonylamino); alkyl or aryl sulfonylamino group (preferably substituted or non-substituted $C_{1-30}$ alkyl sulfonylamino group and substituted or non-substituted $C_{6-30}$ aryl sulfonylamino group such as methyl sulfonylamino, butyl sulfonylamino, phenyl sulfonylamino, 2,3,5-trichlorophenyl sulfonylamino and p-methylphenyl sulfonylamino); mercapto group, alkylthio group (preferably substituted or non-substituted $C_{1-30}$ alkylthio group such as methylthio, ethylthio and n-hexadecylthio); arylthio group (preferably substituted or non-substituted $C_{6-30}$ arylthio group such as phenylthio, p-chlorophenylthio and m-methoxyphenylthio); heterocyclic thio group (preferably substituted or non-substituted $C_{2-30}$ heterocyclic thio group such as 2-benzothiazolyl thio and 1-phenyltetrazole-5-yl thio);

sulfamoyl group (preferably substituted or non-substituted $C_{0-30}$ sulfamoyl group such as N-ethylsulfamoyl, N-(3-dodecyloxy propyl)sulfamoyl, N,N-dimethylsulfamoyl, N-acetylsulfamoyl, N-benzoyl sulfamoyl and N—(N'-phenyl carbamoyl)sulfamoyl); sulfo group; alkyl or aryl sulfinyl group (preferably substituted or non-substituted $C_{1-30}$ alkyl sulfinyl group and substituted or non-substituted $C_{6-30}$ aryl sulfinyl group such as methyl sulfinyl, ethyl sulfinyl, phenyl sulfinyl and p-methyl sulfinyl); alkyl or aryl sulfonyl group (preferably substituted or non-substituted $C_{1-30}$ alkyl sulfonyl group and substituted or non-substituted $C_{6-30}$ aryl sulfonyl group such as methyl sulfonyl, ethyl sulfonyl, phenyl sulfonyl and p-methylphenyl sulfonyl);

acyl group (preferably formyl, substituted or non-substituted $C_{2-30}$ alkyl carbonyl group, and substituted or non-substituted $C_{7-30}$ aryl carbonyl group such as acetyl and pivaloyl benzoyl); aryloxy carbonyl group (preferably substituted or non-substituted $C_{7-30}$ aryloxy carbonyl group such as phenoxy carbonyl, o-chloro phenoxy carbonyl, m-nitro phenoxy carbonyl and p-tert-butyl phenoxy carbonyl); alkoxy carbonyl group (preferably substituted or non-substituted $C_{2-30}$ alkoxy carbonyl group such as methoxy carbonyl, ethoxy carbonyl, tert-butoxy carbonyl and n-octadecyloxy carbonyl); carbamoyl group (preferably substituted or non-substituted $C_{1-30}$ carbamoyl group such as carbamoyl, N-methyl carbamoyl, N,N-dimethyl carbamoyl, N,N-di-n-octyl carbamoyl and N-(methylsulfonyl)carbamoyl);

aryl or heterocyclic azo group (preferably substituted or non-substituted $C_{6-30}$ aryl azo and substituted or non-substituted $C_{3-30}$ heterocyclic azo group such as phenyl azo, p-chlorophenyl azo and 5-ethylthio-1,3,4-thiadiazole-2-yl azo); imido group (preferably N-succinimido and N-phthalimido); phosphino group (preferably substituted or non-substituted $C_{2-30}$ phosphino group such as dimethyl phosphino, diphenyl phosphino and methylphenoxy phosphino); phosphinyl group (preferably substituted or non-substituted $C_{2-30}$ phosphinyl group such as phosphinyl, dioctyloxy phosphinyl and diethoxy phosphinyl); phosphinyl oxy group (preferably substituted or non-substituted $C_{2-30}$ phosphinyloxy group such as diphenoxy phosphinyloxy and dioctyloxy phosphinyloxy); phosphinyl amino group (preferably substituted or non-substituted $C_{2-30}$ phosphinyl amino group such as dimethoxy phosphinyl amino and dimethylamino phosphinyl amino);

and silyl group (preferably substituted or non-substituted $C_{3-30}$ trimethyl silyl, tert-butyl dimethyl silyl and phenyl dimethyl silyl).

The substituents, which have at least one hydrogen atom, may be substituted by at least one substituent selected from these. Examples such substituent include alkylcarbonylaminosulfo, arylcarbonylaminosulfo, alkylsulfonylaminocarbonyl and arylsulfonylaminocarbonyl. More specifically, methylsulfonylaminocarbonyl, p-methylphenylsulfonylaminocarbonyl, acetylaminosulfonyl and benzoylaminosulfonyl are exemplified.

$R^1$ preferably represents a halogen atom, alkyl group, alkenyl group, aryl group, heterocyclic group, hydroxyl group, carboxyl group, alkoxy group, aryloxy group, acyloxy group, cyano group or amino group, and more preferably, a halogen atom, alkyl group, cyano group or alkoxy group.

If plural $R^1$ may form a ring, a five- to eight-membered ring is preferable and a five- or six-membered ring is more preferable. A six-membered ring is most preferable.

In formula (I) or (II), m indicates the number of substitution with $R^1$, and it varies depending on a structure of a ring which is formed by Z and C—C=C—C or C=C—C=C. The minimum value of m is 0; and the maximum value of m is 4 when Z represents two carbon atoms, and the ring formed by Z and C—C=C—C or C=C—C=C is non-aromatic. Preferably, m is 0 or 1, and more preferably 0.

In formula (I) or (II), $R^2$ and $R^3$ independently each represent a substituent. Examples of the substituent are same as those exemplified as examples of $R^1$. $R^2$ and $R^3$ may be present along the long direction of each molecule of the compound represented by formula (I) or (II).

Preferably, the compound represented by formula (I) or (II) exhibit liquid crystallinity. Element capable of developing liquid crystallinity is a rigid portion, which is called as "core", and a flexible portion, which is called as "side chain", as described in the third chapter "*Bunshi-kouzou to Ekisho-ser*" (Molecular structure and Liquid crystallinity) in *Ekisho Binran* (Handbook of Liquid Crystals), published by MARUZEN. Therefore, preferably, there is at least one rigid portion, that is, a cyclic portion in the substituent of $R^2$ or $R^3$. $R^2$ and $R^3$ preferably represent a substituted or non-substituted phenyl or a substituted or non-substituted cyclohexyl. A substituted phenyl or cyclohexyl is preferable; and a phenyl or cyclohexyl having a substituent at a 4-position is more preferable. Even much more preferable is a phenyl having a benzoyl oxy, having a substituent at a 4-position, at a 4-position; a cyclohexyl having a phenyl, having a substituent at a 4-position, at a 4-position; or a cyclohexyl having a cyclohexyl phenyl, having a substituent at a 4-position, at a 4-position. That is, preferably, $R^2$ and $R^3$ independently each represent any one of those shown below.

[Formula 7]

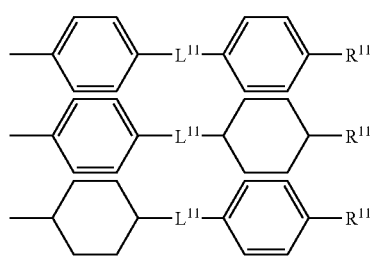

-continued

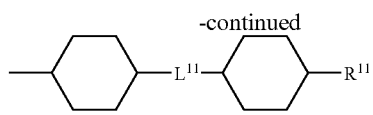

In the formula, $L^{11}$ represents a single bond or a linking group; and $R^{11}$ is a substituent. Preferably, $L^{11}$ represents a single bond, —O—, —COO— or —OCO—. Examples of the substituent represented by $R^{11}$ are same as those exemplified as examples of the substituent represented by $R^1$. Among those, preferred are a substituted or non-substituted $C_{1-10}$ alkyl carbonyloxy group (including cycloalkyl carbonyloxy group), a substituted or non-substituted $C_{1-10}$ alkoxy group, and a substituted or non-substituted $C_{6-16}$ aryl carbonyloxy group; and more preferred are a substituted or non-substituted $C_{1-8}$ alkyl carbonyloxy group and substituted or non-substituted $C_{1-10}$ alkoxy group. In the alkyl chain of the alkyl carbonyloxy group or the alkoxy group, one of carbon atoms, which are not adjacent to each other, may be replaced with an oxygen or sulfur atom. The terminal of the alkyl chain preferably connects to any polymerizable group, described hereinunder, such as (M-1) and (M-2), but is not limited.

A cyclohexyl group having a substituent at a 4-position has cis- and trans-stereoisomers; however, according to the invention, they are not limited, and the mixture thereof may be used. A trans-cyclohexyl group is preferable.

In formula (I) or (II), $R^5$ and $R^6$ independently each represent a substituent. Examples of the substituent are same as those exemplified as examples of $R^1$. Preferably, at least one of $R^5$ and $R^6$ is an electron attractive substituent whose Hammett's constant $\sigma_p$ is equal to or more than 0; and more preferably, at least one of $R^5$ and $R^6$ is an electron attractive substituent whose $\sigma_p$ is from 0 to 1.5. Examples of such an electron attractive substituent include trifluoro methyl group, cyano group, carbonyl group and nitro group. $R^5$ and $R^6$ may connect to each other to form a ring.

Regarding Hammett's constant $\sigma_p$ or $\sigma_m$, the details are described in "*Hammetto-soku Kouzoul to Hanousel*" (Hammett rule—Structure and Reactivity), written by Naoki Inamoto, and published by MARUZEN; "*Shin Jikken Kagaku Kouza* 14 *Yuuki Kagoubutsu no Gousei to Hannouou V*" (New Experimental Chemistry Course 14 Syntheses and Reactions of Organic Compounds V), p. 2605, edited by The Chemical Society of Japan, and published by MARUZEN; "*Riron Yuki Kagaku Kaisetsu*" (Theory Organic Chemistry Exposition), p. 217, written by Nakatani Tadao, and published by TOKYO KAGAKU DOUJIN; and "Chemical Review", vol. 91, p. 165-195, 1991.

In formula (I) or (II), $A^1$ and $A^2$ independently each represent a group selected from the group consisting of —O—, —NR— (R is a hydrogen atom or substituent), —S— and —CO—. Preferred is —O—, —NR— (R is a substituent whose examples are same as those exemplified as examples of $R^1$) or S—.

In formula (I), X represents any of the Group XIV to XVI non-metallic atoms, to which a hydrogen atom or substituent $R^4$ may be bound. Preferably, X represents =O, =S, =NR$^4$ or =C(R$^5$)R$^6$. $R^4$, $R^5$ and $R^6$ independently each represent a substituent, and its examples are same as those exemplified as examples of $R^1$.

Preferable examples of $R^5$ and $R^6$ include a cyano group (CN), acyl group (—COR, where R is a substituted or non-substituted alkyl or aryl group), substituted or non-substituted alkoxycarbonyl or aryloxycarbonyl group (C(=O)OR, where R is a substituted or non-substituted alkyl or aryl group), and substituted or non-substituted carbamoyl group $(C(=O)NR^{11}R^{12}$, where $R^{11}$ and $R^{12}$ independently each represent a hydrogen atom or a substituted or non-substituted alkyl or aryl group, and they may connect to each other to form a ring). The alkyl group represented by R, $R^{11}$ or $R^{12}$ is preferably a substituted or non-substituted $C_1$-$C_{10}$ alkyl group, more preferably a substituted or non-substituted $C_2$-$C_8$ alkyl group, and even more preferably a substituted or non-substituted $C_2$-$C_6$ alkyl group. In the alkyl group, one of carbon atoms, which are not adjacent to each other, may be replaced with an oxygen or sulfur atom. Examples of the aryl group represented by R, $R^{11}$ or $R^{12}$ include those exemplified as examples of the aryl group represented by $R^1$. Examples of the substituent which are carried by the alkyl or aryl group include those exemplified as examples of the substituent represented by $R^1$. Those having any polymerizable group described hereinunder as a substituent are also preferable. Examples of the ring which is formed by $R^{11}$ and $R^{12}$ connecting each other include piperazine ring.

It is preferable that one of $R^5$ and $R^6$ is a cyano group and another is a substituted or non-substituted alkoxycarbonyl group.

The liquid crystal compound represented by formula (I) or (II) has a polymerizable group. Because of this, it is possible to cure the alignment state and to prevent retardation from changing due to heat or the like. Preferably, the polymerizable group is at a terminal of each molecule. In formula (I) or (II), at least one of R, $R^1$, $R^2$, $R^3$, $R^5$ and $R^6$ has a polymerizable group. The number of the polymerizable group in each molecule is preferably from 1 to 6, more preferably from 1 to 4 and much more preferably from 1 to 3. More preferably, at least one of $R^2$, $R^3$, $R^5$ and $R^6$ has a polymerizable group.

Preferable examples of the polymerizable group represented by at least one of R, $R^1$, $R^2$, $R^3$, $R^5$ and $R^6$ include groups capable of additional polymerization or condensation polymerization. As such polymerizable group, a polymerizable ethylenic unsaturated group and a ring-opening polymerizable group are preferable. Examples of the polymerizable group include those shown below.

[Formula 8]

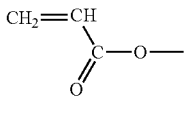
(M-1)

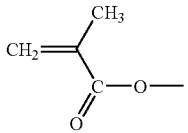
(M-2)

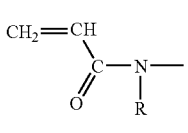
(M-3)

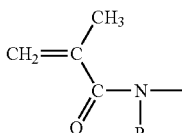
(M-4)

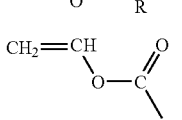
(M-5)

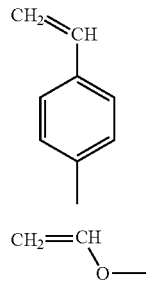
(M-6)

(M-7)

Furthermore, groups capable of additional polymerization are especially preferable as a polymerizable group. As such a polymerizable group, a polymerizable ethylenic unsaturated group and a ring-opening polymerizable group are especially preferable.

Preferably, the polymerizable group is a group represented by any one of formulae P1, P2, P3 and P4.

[Formula 9]

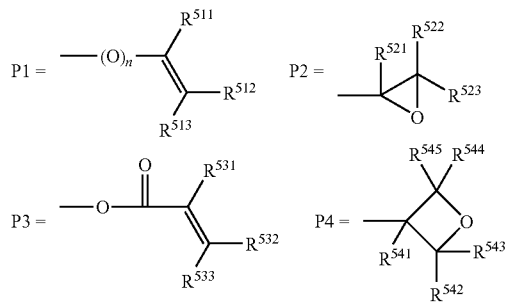

In the formulae, $R^{511}$, $R^{512}$, $R^{513}$, $R^{521}$, $R^{522}$, $R^{523}$, $R^{531}$, $R^{532}$, $R^{533}$, $R^{541}$, $R^{542}$, $R^{543}$, $R^{544}$ and $R^{545}$ independently each represent a hydrogen atom or an alkyl group. In the formula, n indicates 0 or 1.

In polymerizable group P1, $R^{511}$, $R^{512}$ and $R^{513}$ independently each represent a hydrogen atom or an alkyl group. The alkoxy, alkoxycarbonyl or alkoxycarbonyl oxy residue, which is formed by connecting to polymerizable group P1, represents an alkylene oxy group (including an alkylene oxy group such as ethylene oxy, propylene oxy, butylene oxy, pentylene oxy, hexylene oxy and heptylene oxy; and a substituted alkylene oxy group, containing an ether bond, such as ethylene oxy ethoxy); an alkylene oxy carbonyloxy group (including an alkylene oxy carbonyloxy group such as ethylene oxy carbonyloxy, propylene oxy carbonyloxy, butylene oxy carbonyloxy, pentylene oxy carbonyloxy, hexylene oxy carbonyloxy and heptylene oxy carbonyloxy; and a substituted alkylene oxy carbonyloxy group, containing an ether bond, such as ethylene oxy ethoxy carbonyloxy); and an alkylene oxy carbonyl group (including an alkylene oxy carbonyl group such as ethylene oxy carbonyl, propylene oxy carbonyl, butylene oxy carbonyl, pentylene oxy carbonyl, hexylene oxy carbonyl and heptylene oxy carbonyl; and a substituted alkylene oxy carbonyl group, containing an ether bond, such as ethylene oxy ethoxy carbonyl). Polymerizable group P1 may connect to the aromatic ring directly.

In the group, n indicated an integer from 0 to 1, and preferably n is 1. When n is 1, polymerizable group P1 is a substituted or non-substituted vinyl ether group. $R^{511}$ and $R^{513}$ independently each represent a hydrogen atom or an alkyl group (such as methyl, ethyl, n-propyl, isopropyl, n-butyl, pentyl, hexyl, octyl and nonyl; a low alkyl group such as methyl and ethyl is preferable; and methyl is more preferable); and the combination, wherein $R^{511}$ is methyl and $R^{513}$ is a hydrogen atom, or the combination, wherein both of $R^{511}$ and $R^{513}$ are hydrogen atoms, is preferable.

$R^{512}$ represents a hydrogen atom or a substituted or non-substituted alkyl group (such as methyl, ethyl, n-propyl, isopropyl, n-butyl, pentyl, hexyl, octyl, nonyl, 2-chloro ethyl, 3-methoxy ethyl and methoxy ethoxy ethyl; a low alkyl group such as methyl and ethyl is preferable; and methyl is more preferable); preferably a hydrogen atom or a low alkyl group; and more preferably a hydrogen atom. Accordingly, as polymerizable group P1, generally, non-substituted vinyloxy group, which exhibits a high-activity of polymerization, is preferable.

Polymerizable group P2 represents a substituted or non-substituted oxysilane group. $R^{521}$ and $R^{522}$ independently each represent a hydrogen atom or an alkyl group (such as methyl, ethyl, n-propyl, isopropyl, n-butyl, pentyl, hexyl, octyl and nonyl; a low alkyl group such as methyl and ethyl is preferable; and methyl is more preferable); and preferably, both of $R^{521}$ and $R^{522}$ are hydrogen atoms.

$R^{523}$ represents a hydrogen atom or a substituted or non-substituted alkyl group (such as methyl, ethyl, n-propyl, isopropyl, n-butyl, pentyl, hexyl, octyl, nonyl, 2-chloro ethyl, 3-methoxy ethyl and methoxy ethoxy ethyl; a low alkyl group such as methyl and ethyl is preferable; and methyl is more preferable); and preferably a hydrogen atom or a low alkyl group such as methyl, ethyl and n-propyl.

Polymerizable group P3 represents a substituted or non-substituted acryl group. $R^{531}$ and $R^{533}$ independently each represents a hydrogen atom or an alkyl group (such as methyl, ethyl, n-propyl, isopropyl, n-butyl, pentyl, hexyl, octyl and nonyl; a low alkyl group such as methyl and ethyl is preferable; and methyl is more preferable); and the combination, wherein $R^{531}$ is methyl and $R^{533}$ is a hydrogen atom, or the combination, wherein both of $R^{531}$ and $R^{533}$ are hydrogen atoms, is preferable.

$R^{532}$ represents a hydrogen atom or a substituted or non-substituted alkyl group (such as methyl, ethyl, n-propyl, isopropyl, n-butyl, pentyl, hexyl, octyl, nonyl, 2-chloro ethyl, 3-methoxy ethyl and methoxy ethoxy ethyl; a low alkyl group such as methyl and ethyl is preferable; and methyl is more preferable); and preferably a hydrogen atom. Accordingly, as polymerizable group P3, generally, a group, which exhibits a high activity of polymerization, such as a non-substituted acryloxy, methacryloxy and crotonyl oxy is preferably used.

Polymerizable group P4 is a substituted or non-substituted oxetane group. $R^{542}$, $R^{543}$, $R^{544}$ and $R^{545}$ independently each represent a hydrogen atom or an alkyl group (such as methyl, ethyl, n-propyl, isopropyl, n-butyl, pentyl, hexyl, octyl and nonyl; a low alkyl group such as methyl and ethyl is preferable; and methyl is more preferable); and preferably, all of $R^{542}$, $R^{543}$, $R^{544}$ and $R^{545}$ are hydrogen atoms.

$R^{541}$ represents a hydrogen atom or a substituted or non-substituted alkyl group (such as methyl, ethyl, n-propyl, isopropyl, n-butyl, pentyl, hexyl, octyl, nonyl, 2-chloro ethyl, 3-methoxy ethyl and methoxy ethoxy ethyl; a low alkyl group such as methyl and ethyl is preferable; and methyl is more preferable); and preferably, a hydrogen atom or a low alkyl group such as methyl, ethyl and n-propyl.

Examples of the compound represented by formula (I) or (II) include, but are not limited to, those shown below. Regarding the compounds shown below, the parenthetic number is used for identifying an exemplary compound by the expression "Exemplary Compound (X)" unless there is any special mention.

[Formula 10]

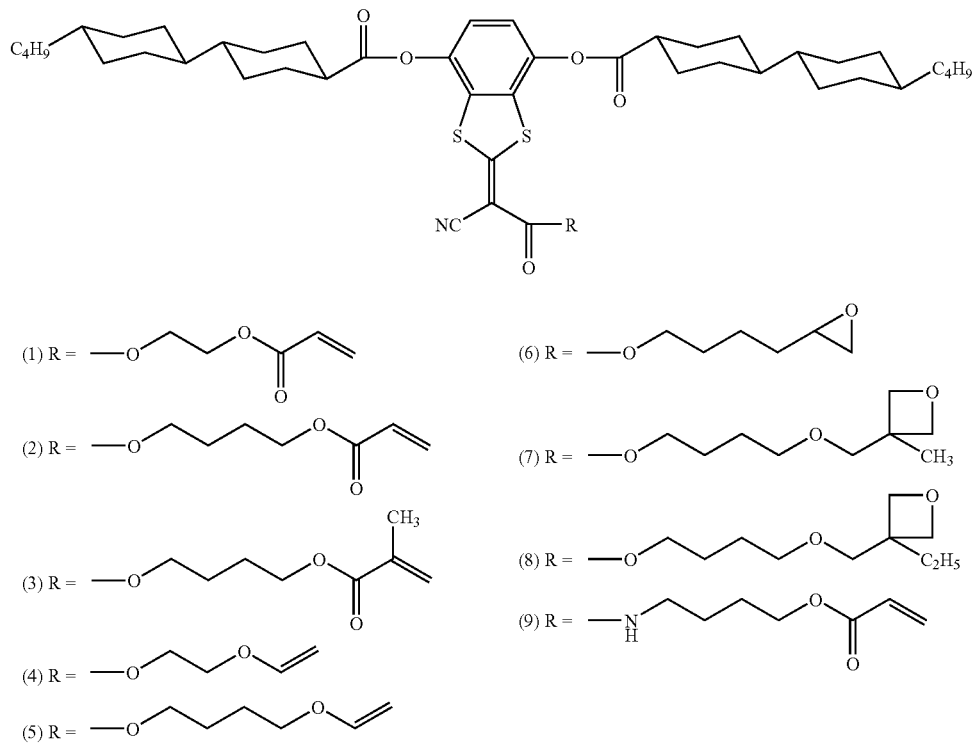

-continued
[Formula 11]
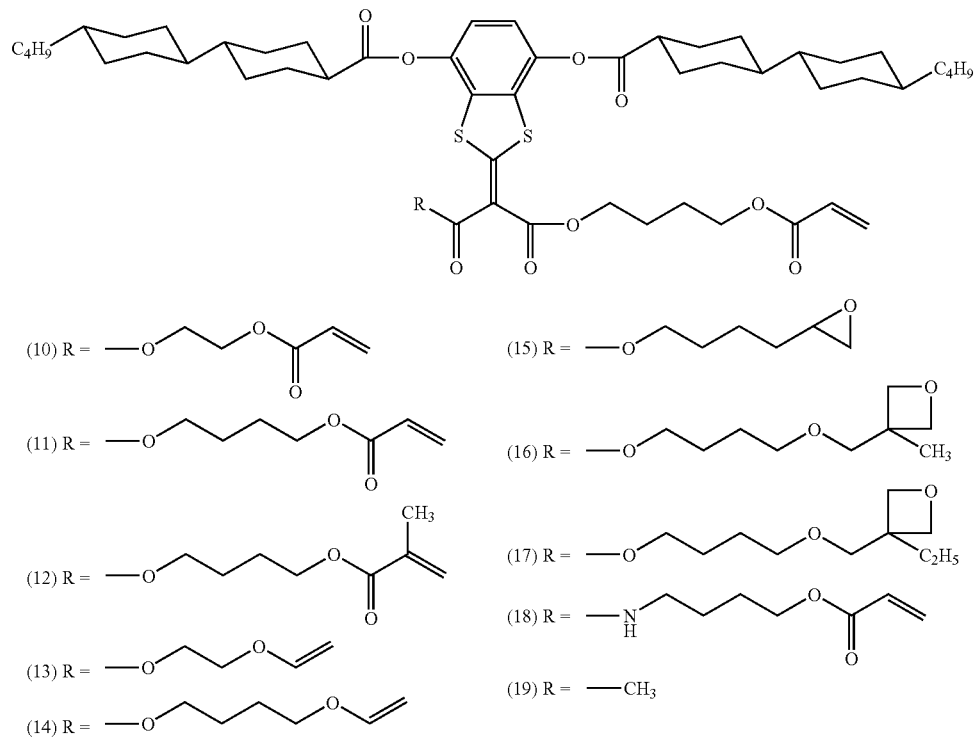
[Formula 12]
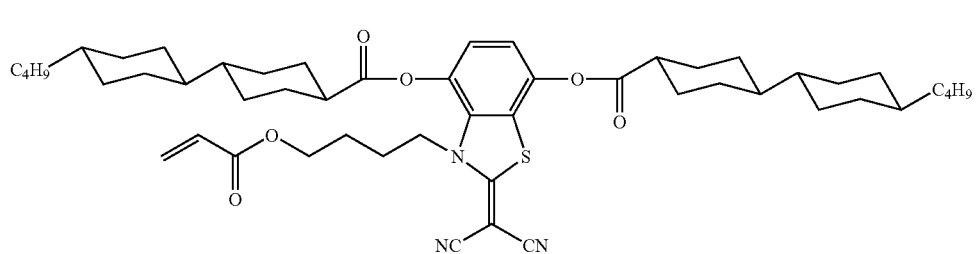
(20)
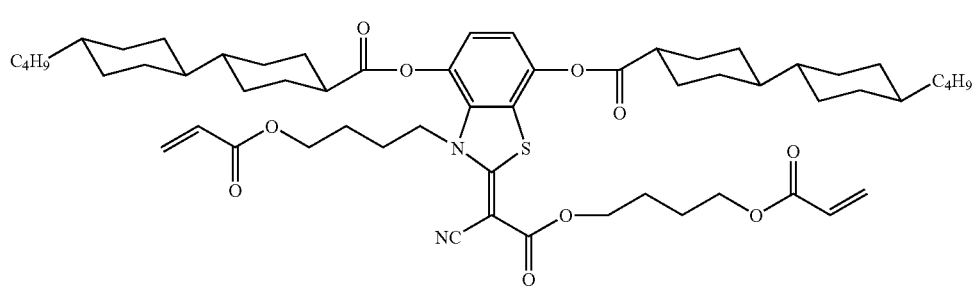
(21)
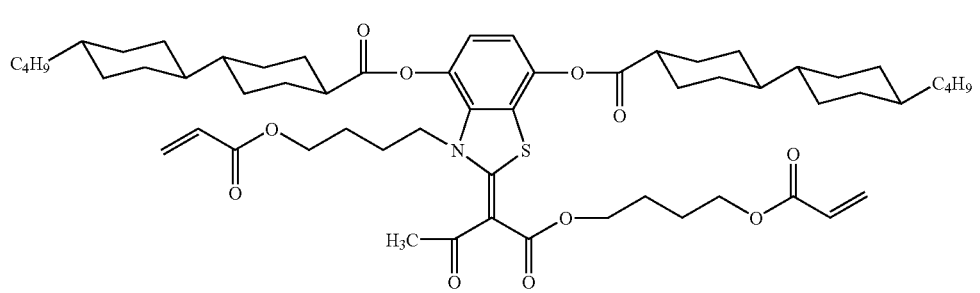
(22)

-continued
[Formula 13]
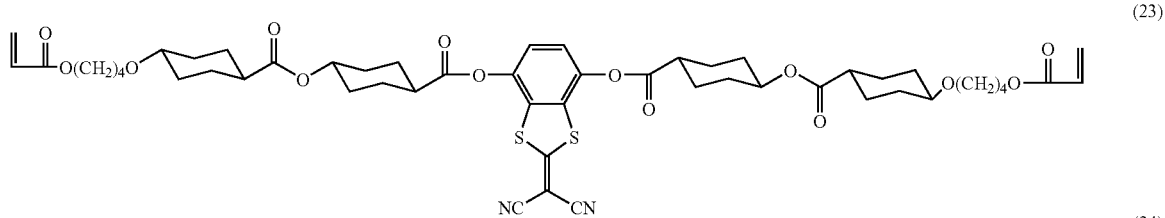
(23)
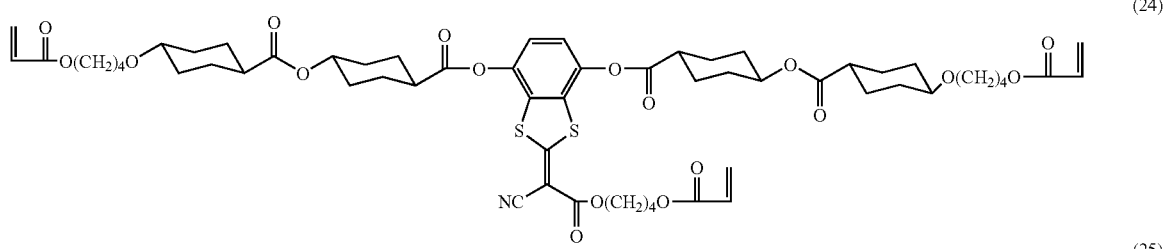
(24)
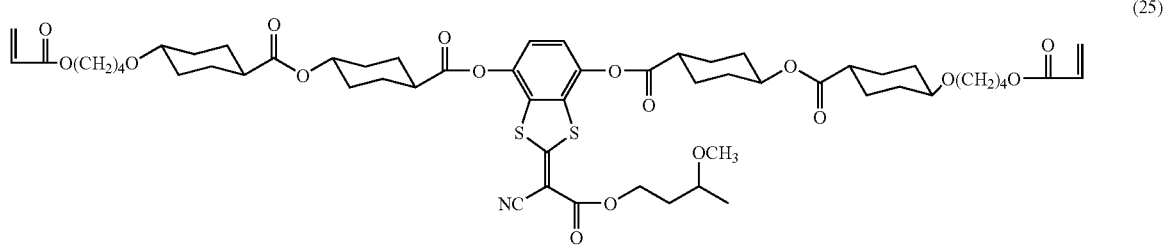
(25)
[Formula 14]
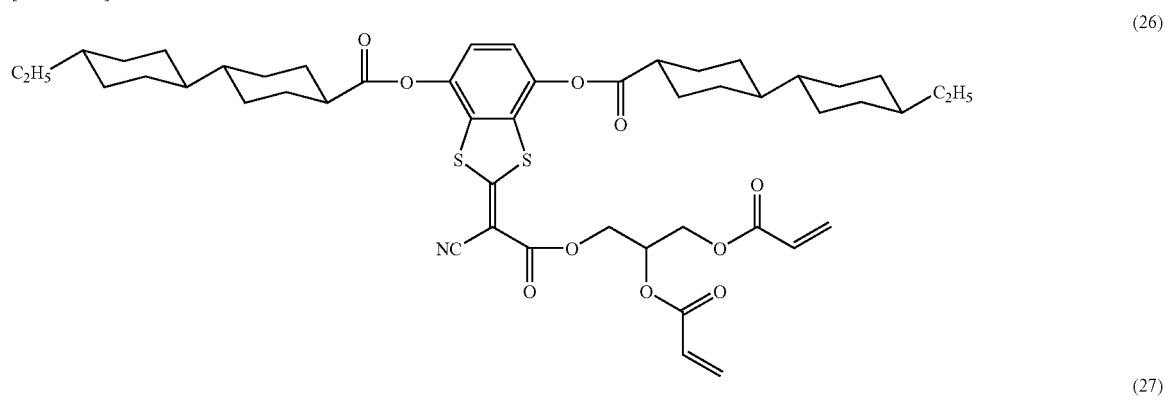
(26)
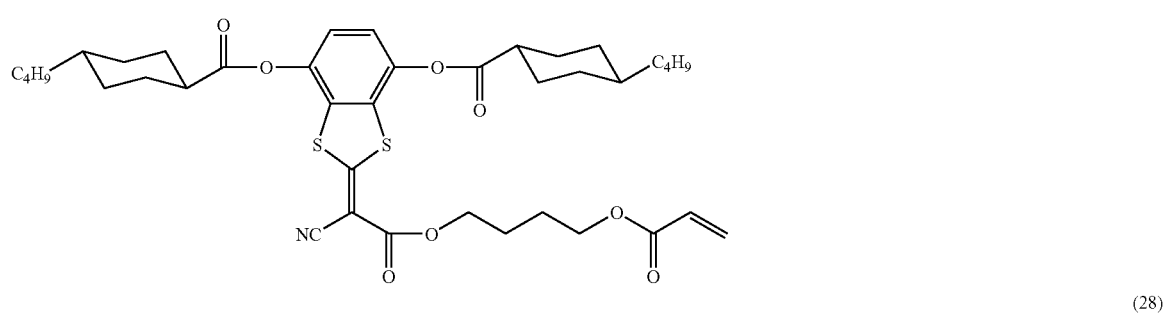
(27)
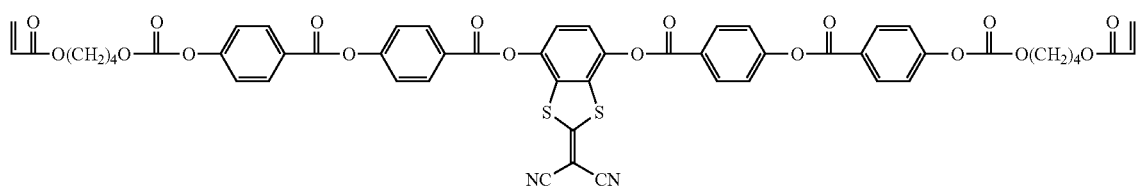
(28)

(29)
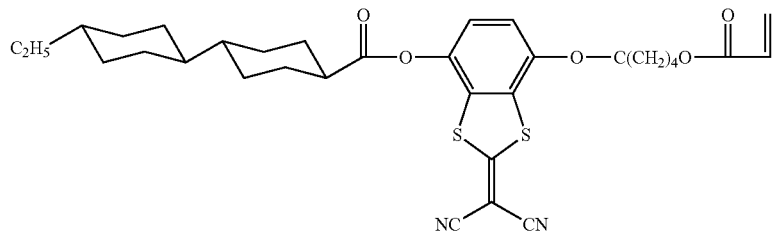
[Formula 15]
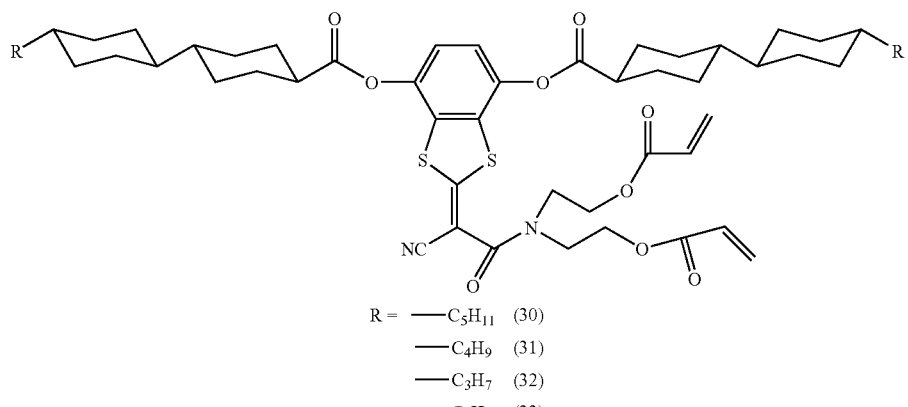
R = —C₅H₁₁ (30)
—C₄H₉ (31)
—C₃H₇ (32)
—C₂H₅ (33)
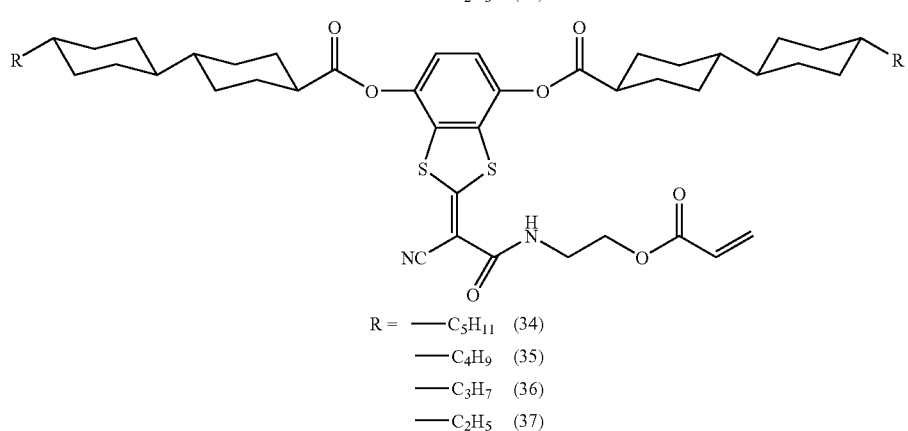
R = —C₅H₁₁ (34)
—C₄H₉ (35)
—C₃H₇ (36)
—C₂H₅ (37)
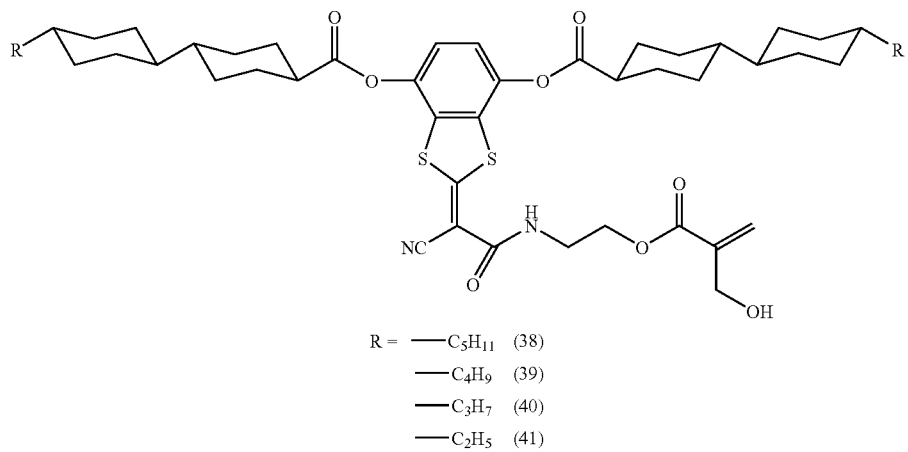
R = —C₅H₁₁ (38)
—C₄H₉ (39)
—C₃H₇ (40)
—C₂H₅ (41)

-continued
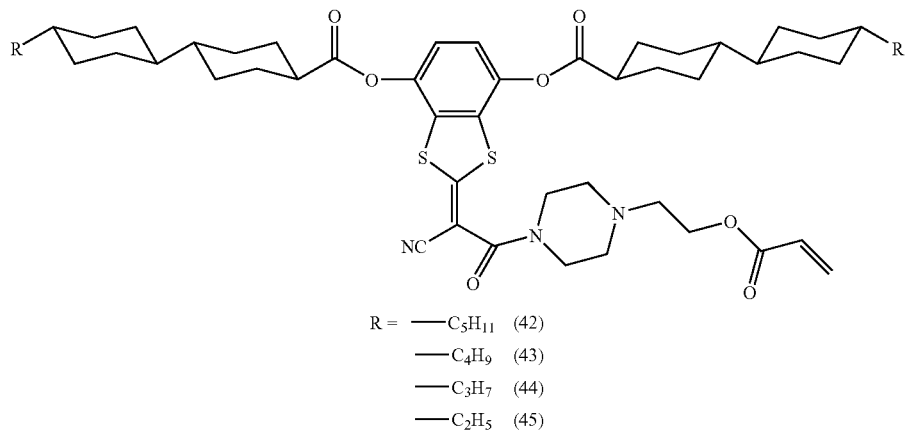
R = —C₅H₁₁ (42)
—C₄H₉ (43)
—C₃H₇ (44)
—C₂H₅ (45)
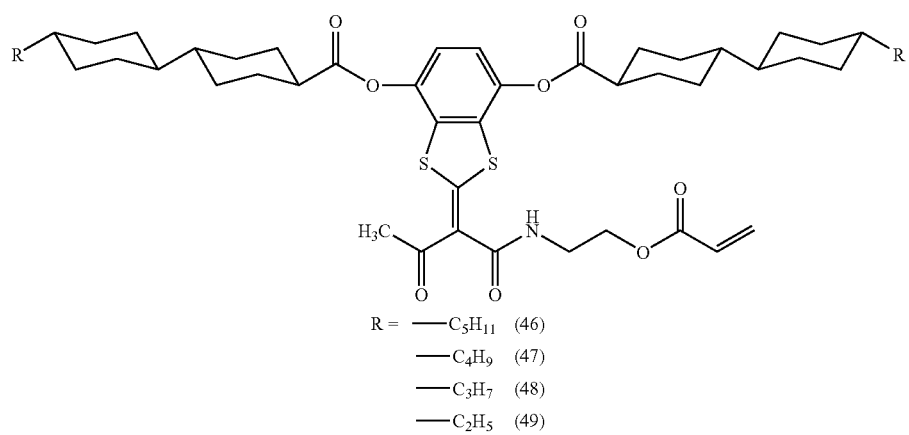
R = —C₅H₁₁ (46)
—C₄H₉ (47)
—C₃H₇ (48)
—C₂H₅ (49)
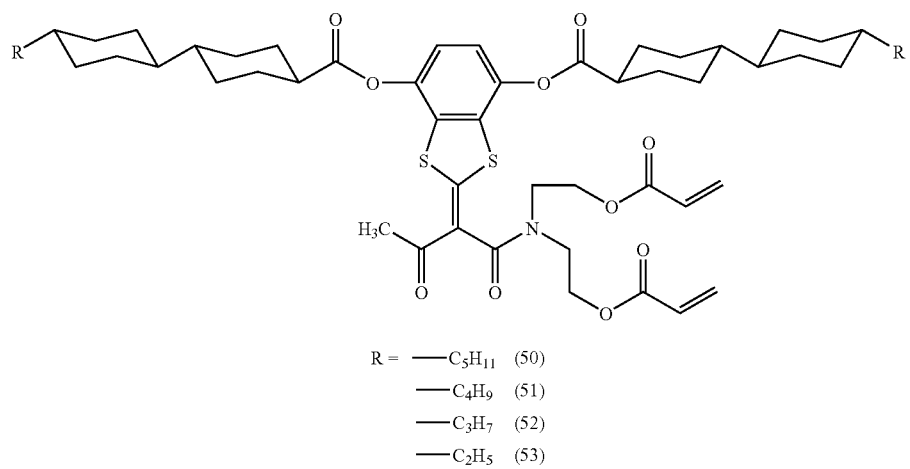
R = —C₅H₁₁ (50)
—C₄H₉ (51)
—C₃H₇ (52)
—C₂H₅ (53)

[Formula 16]
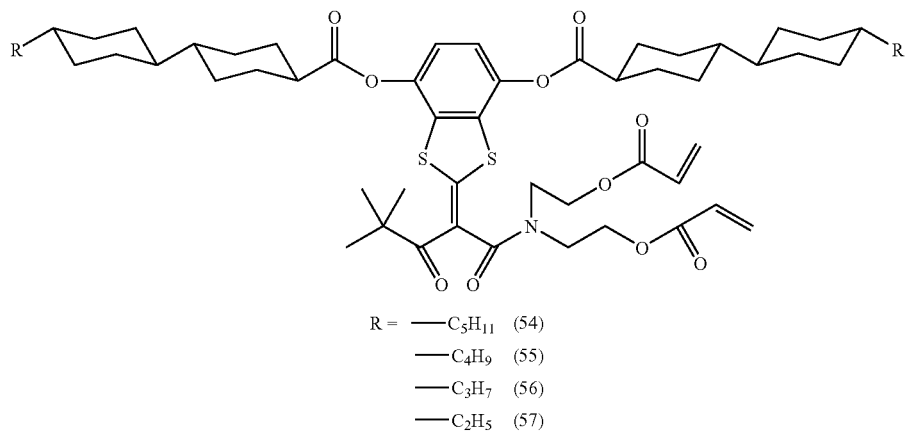
R = —C$_5$H$_{11}$ (54)
—C$_4$H$_9$ (55)
—C$_3$H$_7$ (56)
—C$_2$H$_5$ (57)
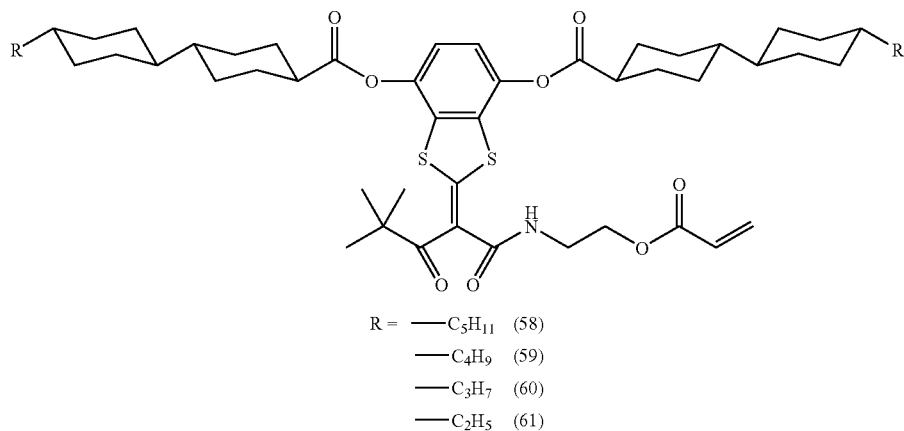
R = —C$_5$H$_{11}$ (58)
—C$_4$H$_9$ (59)
—C$_3$H$_7$ (60)
—C$_2$H$_5$ (61)
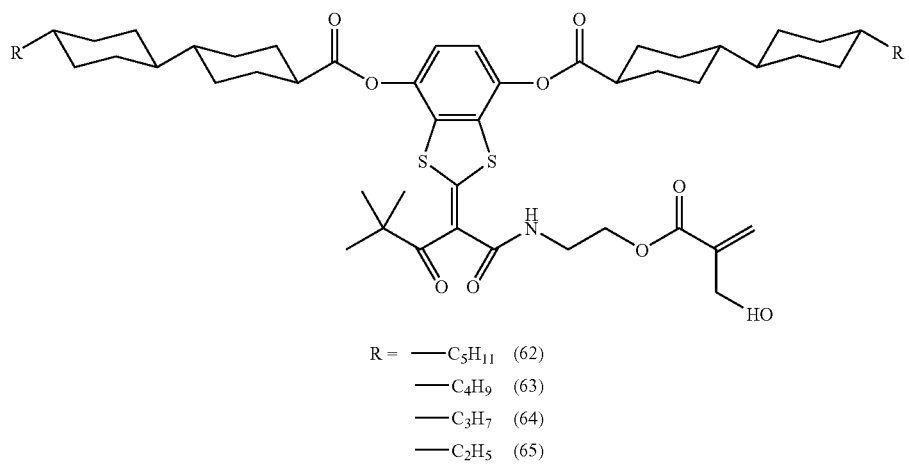
R = —C$_5$H$_{11}$ (62)
—C$_4$H$_9$ (63)
—C$_3$H$_7$ (64)
—C$_2$H$_5$ (65)

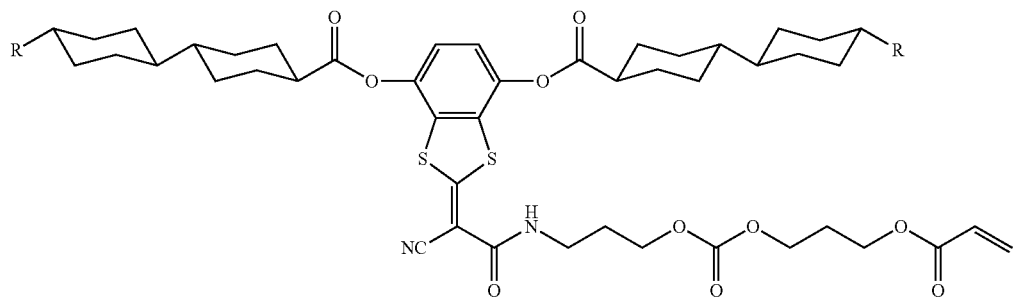
R = —C$_5$H$_{11}$ (66)
—C$_4$H$_9$ (67)
—C$_3$H$_7$ (68)
—C$_2$H$_5$ (69)
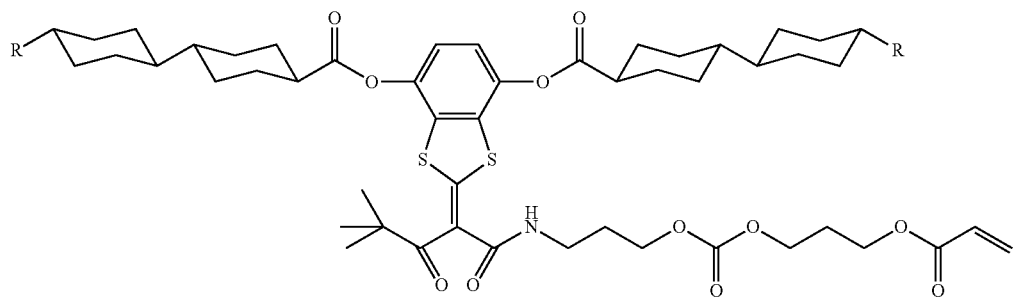
R = —C$_5$H$_{11}$ (70)
—C$_4$H$_9$ (71)
—C$_3$H$_7$ (72)
—C$_2$H$_5$ (73)
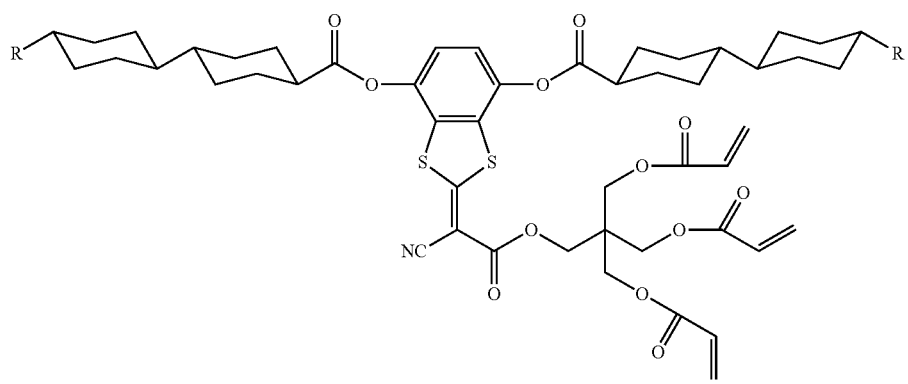
R = —C$_5$H$_{11}$ (74)
—C$_4$H$_9$ (75)
—C$_3$H$_7$ (76)
—C$_2$H$_5$ (77)
The compounds represented by the formula (I) may be synthesized referring to any publicly-known methods. For example, exemplary compound (2) may be synthesized according to the scheme below:

[Formula 17]

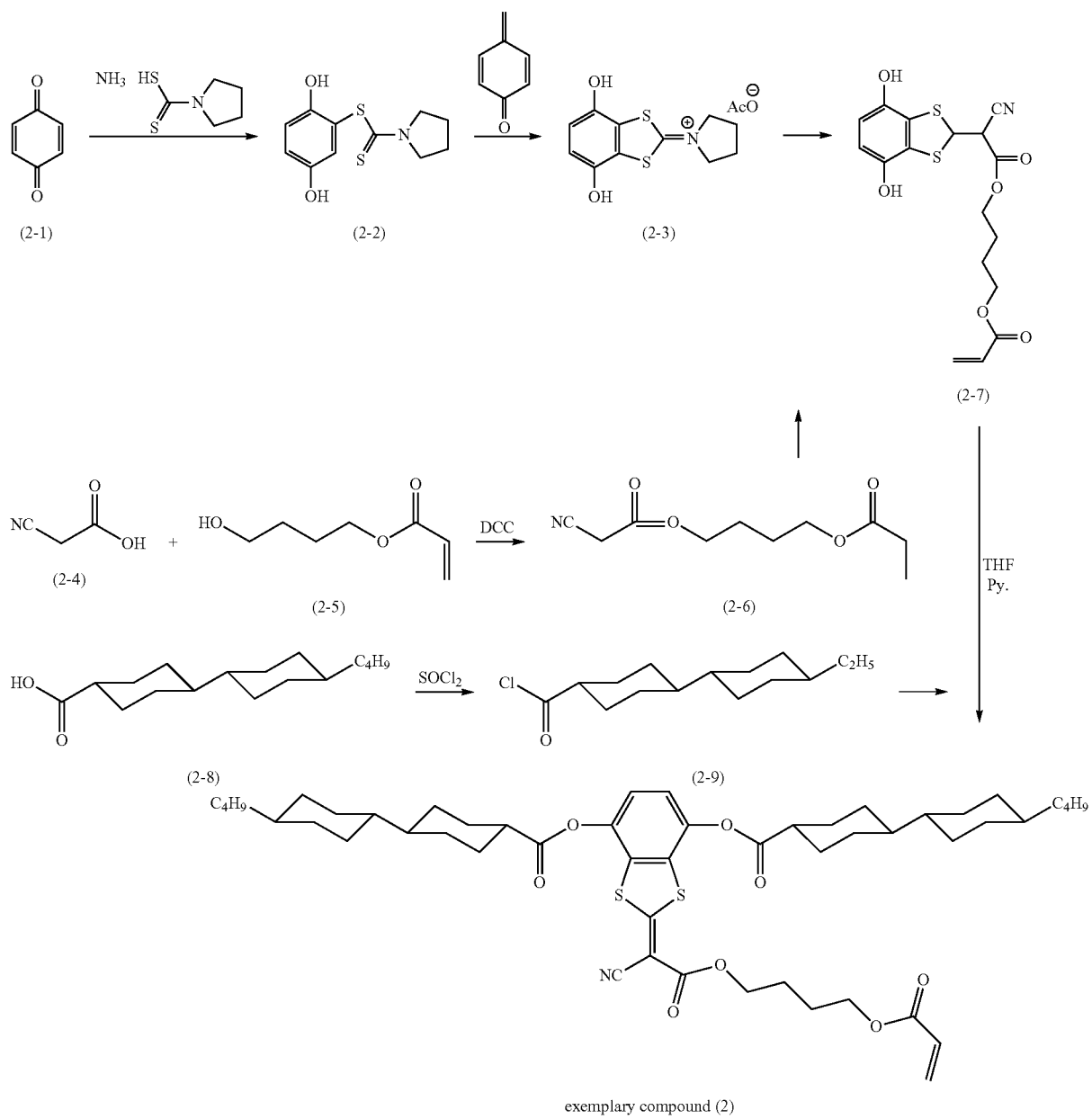

exemplary compound (2)

In the scheme, synthetic procedures from compound (2-1) to compound (2-3) may be carried out, referring to a method described in "Journal of Chemical Crystallography" (1997), 27(9), p. 515-526.

As illustrated in the scheme, compound (2-6) may be obtained from compound (2-4) and compound (2-5) by a standard esterification using dicyclohexylcarbodiimide (DCC). A suspended liquid containing compound (2-3) and compound (2-6) in N-methyl-2-pyrrolidone (NMP), added with a small amount of polymerization inhibitor (trade name: Irganox 1010, from CIBA Specialty Chemicals, Inc.), may be heated to produce compound (2-7). Tetrahydrofuran (THF) solution of compound (2-7) may be added with pyridine (Py) as a base, and further with compound (2-9) which was obtained from compound (2-8) by a standard synthetic process of acid chloride using thionyl chloride, to produce exemplary compound (2).

[Method of Forming Optically Anisotropic Film]

The optically anisotropic film of the present invention may be formed by coating a composition which contains the compound represented by the formula (I) or (II), on the surface of a solid such as polymer film, glass, color filter or the like, optionally having an alignment film preliminarily formed thereon, and by allowing the compound to align and fixed. Coating of the liquid crystal composition may be carried out by spreading a coating liquid of the liquid crystal composition, which contains a solvent as described later, according to any publicly-known method (for example, wire bar coating, extrusion coating, direct gravure coating, reverse gravure coating, die coating). Alternatively, the optically anisotropic film may be formed also by jetting the composition using an ink-jet device.

The "fixed" state is most typically and preferably embodied by a state in which orientation of the liquid crystal compound contained in the optically anisotropic film is maintained, but the state is not limited thereto. More specifically, the state means that the optically anisotropic film shows no fluidity generally over the temperature range from 0° C. to 50° C., or more severely from −30° C. to 70° C., and can stably keep the fixed mode of alignment, without causing any changes in the mode of alignment due to external field or external force.

In one method of fixing the mode of alignment in the present invention, the liquid crystalline composition may once be heated to a temperature at which a liquid crystal phase is formed, and then cooled while keeping the mode of alignment unchanged. In this way, the optically anisotropic film may be formed while fixing, rather than impairing, the mode of alignment in the liquid crystalline state. Alternatively, the optically anisotropic film may be formed also by heating the liquid crystal composition of the present invention, added with a polymerization initiator, up to a temperature at which a liquid crystal phase may be formed, followed by polymerization and cooling, so as to fix the mode of alignment in the liquid crystalline state. The latter method based on polymerization reaction may be more preferable. The polymerization reaction include thermal polymerization making use of a thermal polymerization initiator, photo-polymerization reaction making use of a photo-polymerization initiator, and polymerization reaction assisted by irradiation of electron beam. In view of avoiding heat-induced deformation or denaturation of a support or the like, the polymerization reactions based on photo-polymerization reaction or irradiation of electron beam may be preferable. In the present invention, it is not always necessary for the liquid crystal compound to keep liquid crystallinity after the optically anisotropic film is finally formed, so far as the optical anisotropy thereof may be maintained. For example, a low-molecular-weight liquid crystalline compound may have a group possibly turned reactive by heat, light and so forth, consequently cause polymerization or crosslinking by reaction induced by heat, light and so forth, and may thereby increase in the molecular weight to lose the liquid crystallinity.

The temperature range in which the liquid crystal composition shows liquid crystallinity may preferably reside in the range from 10 to 250° C., and more preferably in the range from 10 to 150° C., in terms of preparation adaptability. If the temperature range resides below 10° C., the liquid crystal composition may require an additional step of cooling in order to lower the temperature thereof down to a range over which the liquid crystal phase appears. On the other hand, if the temperature range resides above 200° C., the liquid crystal composition may require a large energy of heat in order to bring itself once into an isotropic liquid state at a temperature still higher than the temperature range over which the liquid crystalline phase appears. This is disadvantageous in view of waste of heat energy, deformation and denaturation of the substrate, and so forth.

In the liquid crystal composition of the present invention, only a single species, or a plurality of species of the liquid crystal compound may be used. For example, a polymerizable liquid crystal compound and a non-polymerizable liquid crystal compound may be used in combination. Alternatively, a low-molecular-weight liquid crystal compound and a polymer liquid crystal compound may be used in combination. Still alternatively, a plurality of species of liquid crystal compound which satisfy the mathematical expression (1) may be mixed. The mixing may be expected to lower the melting point, to thereby expand the temperature range over which the liquid crystal phase appears. As the liquid crystal compounds which satisfy the mathematical expression (1), but other than those represented by the formula (I), the liquid crystal compounds typically described in Japanese Laid-Open Patent Publication No. 2005-289980 may be adoptable.

The optically anisotropic film may be prepared also by using a liquid crystal composition prepared by mixing the liquid crystal compound which satisfies numerical expression (1), with a liquid crystal compound which shows regular wavelength dispersion characteristics of birefringence $\Delta n$, that is, whose birefringence is larger at shorter wavelength region, at least over the range from 450 to 550 nm. More specifically, a liquid crystal compound which satisfies numerical expression (4) below may be used in combination.

$$\Delta n(450 \text{ nm})/\Delta n(550 \text{ nm}) > 1 \tag{4}.$$

By mixing the liquid crystal compound which satisfies the mathematical expression (1), typically with a liquid crystal compound which satisfies the mathematical expression (4) and shows regular wavelength dispersion characteristics of birefringence $\Delta n$, it is now possible to prepare a liquid crystal composition which exhibits intermediate wavelength dispersion characteristics. The mixing contributes also to increase $\Delta n$ of the composition, and raises an advantage in that the optically anisotropic film having a desired retardation may be obtained only with a small thickness. The ratio of mixing is not specifically limited, and may be determined depending on applications and desired optical characteristics.

In the liquid crystal composition (in the solid matter exclusive of solvent, if the composition has a liquid form such as coating liquid), content of the liquid crystal compound represented by the formula (I) or (II), used for preparation of the optically anisotropic film of the present invention, may preferably be 10 to 100% by mass, more preferably 40 to 100% by mass, still more preferably 30 to 90% by mass, and further more preferably 50 to 90% by mass.

The liquid crystal composition may optionally contain arbitrary additive, besides the liquid crystal compound represented by the formula (I) or (II). Examples of the additives include liquid crystal compounds other than those represented by the formula (I) or (II), compounds for controlling tilt angle of the liquid crystalline compound described later, nonuniformity preventive agent, anti-cissing agent, polymerization initiator, and polymerizable monomer.

[Compounds for Controlling Tilt Angle of Liquid Crystalline Compound]

The tilt angle observed at the lower interface of the optically anisotropic film (that is, the interface on the substrate side, if the optically anisotropic film is formed on the surface of a substrate such as a polymer film), and the tilt angle observed at the upper interface (that is, the interface on the air side) may be controlled by appropriately selecting an alignment agent for the air interface side, which is to be added to the alignment film or to the liquid crystal layer. As for relation between rubbing density of the alignment film and the tilt angle of the liquid crystal compound at the interface with the alignment film, it has been known that larger rubbing density reduces the tilt angle, and smaller rubbing density increases the tilt angle. Therefore, the tilt angle on the substrate side may be adjustable also by varying the rubbing density of the alignment film. Additives for reducing and increasing the tilt angle on the air interface side, and additives for increasing the tilt angle on the alignment film side will be exemplified. By adopting these control techniques, the optically anisotropic film may have a state of alignment characterized by nearly uniform inclination in the thickness-wise direction, a hybrid alignment characterized by larger tilt angle on the lower interface side than on the air interface side, and a hybrid alignment conversely characterized by smaller tilt angle on the lower interface side than on the air interface side. Any of these modes may preferably be adoptable to the present invention.

The tilt angle of each molecule of the liquid crystal compound at an air-interface may be reduced or each molecule of the liquid crystal compound at an air-interface may be aligned horizontally by adding at least one compound represented by any one of formula (X1) to (X3) to the composition to be used for preparing the optically anisotropic film. Using a high-tilt alignment layer, any hybrid alignment, wherein the tilt angle is decreased along the direction going from the substrate surface to the upper surface, may be obtained. The degree of decrease in the tilt angle may depend on the additional amount; and therefore, the desired tilt angle may be obtained by adjusting the additional amount. It is to be noted that the term "horizontal alignment" means the alignment state wherein the long axes of liquid crystal molecules are parallel to the layer plane; however, in the specification, the term is used not only for an alignment state showing a strict parallel but also for any alignment states with a tilt angle of less than 10 degrees.

Formulae (X1) to (X3) will be described in detail.

[Formula 18]

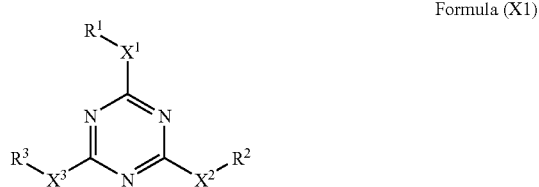

Formula (X1)

In the formula, $R^1$, $R^2$ and $R^3$ independently represent a hydrogen atom or a substituent; and $X^1$, $X^2$ and $X^3$ independently represent a single bond or a divalent linking group. The substituent represented by $R^1$, $R^2$ or $R^3$ is preferably a substituted or non-substituted, alkyl group (more preferably, a non-substituted or fluorinated alkyl group), aryl group (more preferably, an aryl group having a fluorinated alkyl group), amino group, alkoxy group or alkylthio group, or a halogen atom. The divalent linking group represented by $X^1$, $X^2$ or $X^3$ is preferably a divalent linking group selected from the group consisting of an alkylene group, an alkenylene group, a divalent aromatic group, a divalent hetero ring residue, —CO—, —$NR^a$— ($R^a$ represents a $C_{1-5}$ alkyl group or hydrogen atom), —O—, —S—, —SO—, —$SO_2$— and any combinations thereof. The divalent linking group is more preferably a divalent linking group selected from the group consisting of an alkylene group, a phenylene group, —CO—, —$NR^a$—, —O—, —S—, —$SO_2$— and any combinations thereof. The number of carbon atoms in the alkylene group is preferably from 1 to 12. The number of carbon atoms in the alkenylene group is preferably from 2 to 12. The number of carbon atoms in the divalent aromatic group is preferably from 6 to 10.

[Formula 19]

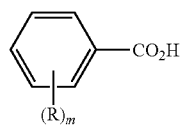

Formula (X2)

In the formula, R represents a substituent; and m is an integer from 0 to 5. When m is an integer of equal to or more than 2, plural R may be same or different from each other. Preferable examples of the substituent represented by R are same as those exemplified as examples of the substituted represented by $R^1$, $R^2$ or $R^3$. m is preferably an integer of from 1 to 3; and 2 or 3 is especially preferable.

[Formula 20]

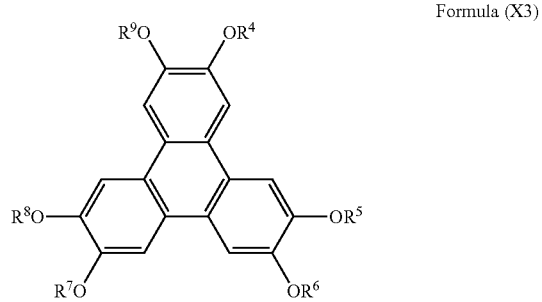

Formula (X3)

In the formula, $R^4$, $R^5$, $R^6$, $R^7$, $R^8$ and $R^9$ independently each represent a hydrogen atom or a substituent. Preferable examples of the substituent represented by $R^4$, $R^5$, $R^6$, $R^7$, $R^8$ or $R^9$ are same as those exemplified as examples of the substituent represented by $R^1$, $R^2$ or $R^3$ in formula (X1). Examples of the agent for promoting horizontal alignment include those described in the specification of Japanese patent application No. 2003-331269 (JP-A-2005-099258); and the syntheses of the compounds are also described in the specification.

The additional amount of the compound represented by any one of formulae (X1)-(X3) is preferably from 0.01 to 20% by mass, more preferably from 0.01 to 10% by mass and much more preferably from 0.02 to 1% by mass with respect to the amount of the liquid crystal compound. It is to be noted that the compound represented by any one of formulae (X1)-(X3) may be used alone or in any combination thereof.

By adding a compound having an acidic group such as —COON and —$SO_3H$, such as AE-1 to AE-4 shown below, to the composition to be used for preparing the optically anisotropic film, the tilt angle of each molecule of the liquid crystal compound at the air-interface may be increased, or the alignment state, in which molecules of the liquid crystal compound are aligned substantially vertically, is obtained. Using a low-tilt alignment layer, any hybrid alignment, wherein the tilt angle is increased along the direction going from the substrate surface to the upper surface, may be obtained.

The larger amount of the compound to be added results in a large tilt angle; and therefore, the amount of the compound to be added may vary depending on the desired tilt angle, is preferably is from 0.01 to 20% by mass, more preferably from 0.01 to 10% by mass and even more preferably from 0.02 to 1% by mass with respect to the amount of the liquid crystal compound.

[Formula 21]

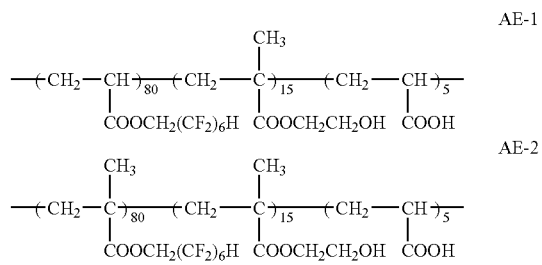

-continued

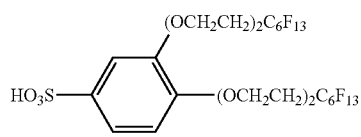
AE-3

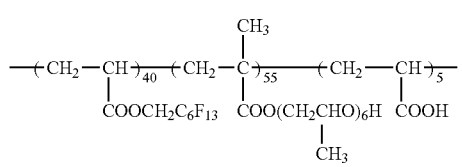
AE-4

By adding at least one ionic low-molecular weight compound, especially at least one compound having a cationic group larger than an anionic group, to the composition to be used for preparing the optically anisotropic film, the tilt angle of each molecule of the liquid crystal compound at the alignment layer—interface may be increased, or molecules of the liquid crystal compound may be aligned substantially vertically. Examples of the compound include PE-1-6 shown below. The degree on increase in the tilt angle may be varied depending on the additional amount; and therefore, the desired tilt angle may be obtained by controlling the additional amount.

The amount of the compound to be added is preferably from 0.01 to 20% by mass, more preferably from 0.01 to 10% by mass and much more preferably from 0.02 to 1% by mass with respect to the amount of the liquid crystal compound.

[Formula 22]

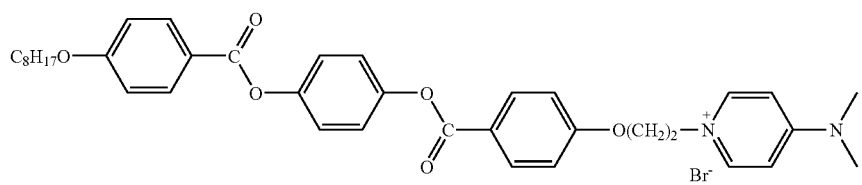
PE-1

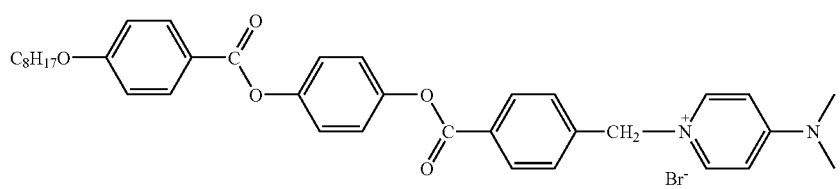
PE-2

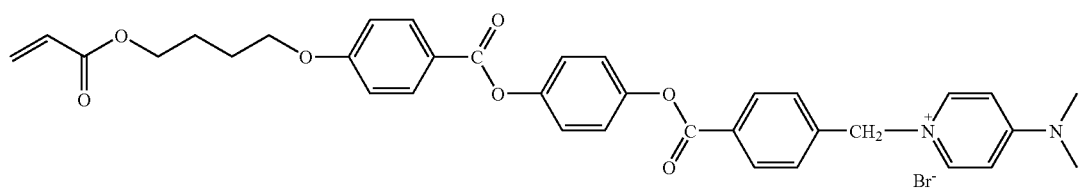
PE-3

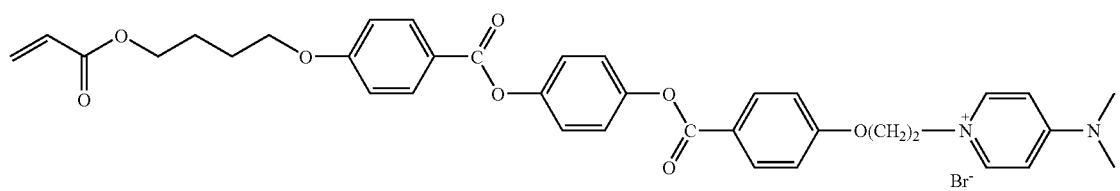
PE-4

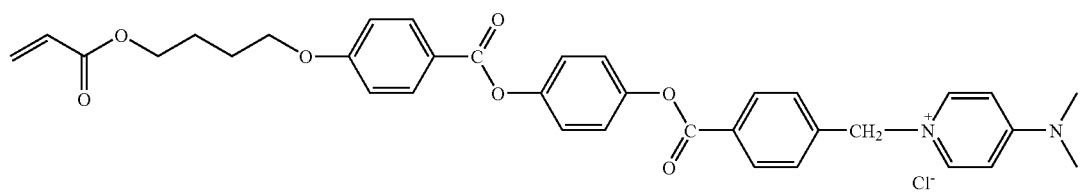
PE-5

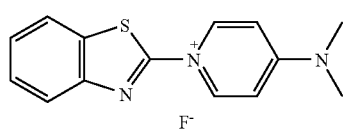
PE-6

(Agent for Preventing Unevenness)

By using a desired additive for preparing the optically anisotropic film, unevenness of optical characteristics caused in the optically anisotropic film may be reduced. The surface tension of a coating liquid may be reduced and the stability in coating may be improved by using an additive. By using the additive, the surface tension of a coating liquid may be reduced and so the stability in coating may be improved. The surface tension of the coating liquid is preferably from 25 to 20 dyn/cm, and more preferably from 23 to 21 dyn/cm. The amount of the additive is preferably from 0.01 to 1.0% mass, and more preferably from 0.02 to 0.5% by mass with respect to the total amount of the liquid crystal composition (the solid content of the composition, if is it a coating liquid). The compound, which can be used as the additive, is not limited, and may be selected from low-molecular weight compounds or high-molecular weight compounds. Preferably, fluorine-containing surfactants shown below or silicon-base compounds are used. As a result, using the additive contributes to reducing unevenness in displaying characteristics of a liquid crystal display device.

[Formula 23]

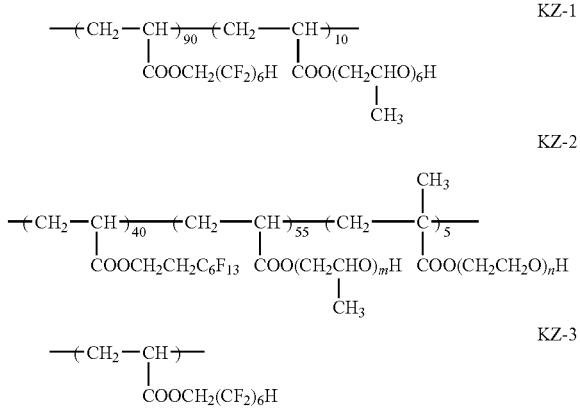

(Anti-Cissing Agent)

The liquid crystal composition for forming the optically anisotropic film may be added with an anti-cissing agent, so as to prevent cissing in the process of coating of the liquid crystal composition. In general, polymers may preferably be adoptable as the anti-cissing agent. The polymers adoptable herein are not specifically limited, so far as they do not induce any changes in the tilt angle of the liquid crystal compound, or do not extremely inhibit alignment of the liquid crystal compound. Examples of the polymer are descried in Japanese Laid-Open Patent Publication No. 8-95030, and specific examples of particularly preferable polymers may be exemplified by cellulose esters. Examples of the cellulose esters include cellulose acetate, cellulose acetate propionate, hydroxypropyl cellulose and cellulose acetate butyrate.

Content of the polymer added aiming at preventing cissing, without inhibiting alignment of the liquid crystal, preferably falls in the range generally from 0.1 to 10% by mass relative to the liquid crystal compound, more preferably in the range from 0.1 to 8% by mass, and still more preferably in the range from 0.1 to 5% by mass.

(Polymerization Initiator)

The liquid crystal composition for forming the optically anisotropic film is preferably a curable composition, and preferably contains a polymerization initiator for this purpose. The polymerization reaction includes heat polymerization reaction using a heat polymerization initiator, photo-polymerization reaction using a photo-polymerization initiator, and polymerization reaction assisted by irradiation of electron beam. Among these, the photo-polymerization reaction and the reaction assisted by irradiation of electron beam are preferable, in view of avoiding heat-induced deformation or denaturation of the support or the like.

Examples of photo-polymerization initiators include alpha-carbonyl compounds (described in U.S. Pat. Nos. 2,367,661 and 2,367,670), acyloin ether (described in U.S. Pat. No. 2,448,828), alpha-hydrocarbon-substituted aromatic acyloin compounds (described in U.S. Pat. No. 2,722,512), polynuclearquinone compounds (described in U.S. Pat. Nos. 3,046,127 and 2,951,758), combinations of triarylimidazole dimers and p-aminophenyl ketones (described in U.S. Pat. No. 3,549,367), acridine and phenadine compounds (described in JPA No. sho 60-105667 and U.S. Pat. No. 4,239,850), and oxadiazole compounds (described in U.S. Pat. No. 4,212,970).

Amount of use of photo-polymerization initiator is preferably from 0.01 to 20% by mass of the liquid crystal composition (solid content, for the case of coating liquid), and more preferably from 0.5 to 5% by mass. Light to be irradiated for polymerization of the liquid crystal compound is preferably ultraviolet radiation. Energy of irradiation is preferably from $10\,mJ/cm^2$ to $50\,J/cm^2$, and more preferably from $50\,mJ/cm^2$ to $800\,mJ/cm^2$. The light may be irradiated under a heating condition, for the purpose of accelerating the photo-polymerization reaction. Oxygen concentration in the atmosphere affects the degree of polymerization. It is, therefore, preferable to lower the oxygen concentration typically by nitrogen replacement, if a desired degree of polymerization cannot be obtained in the air. A preferable oxygen concentration preferably falls on 10% or below, more preferably 7% or below, and most preferably 3% or below.

The rate of polymerization reaction is preferably equal to or more than 70%, more preferably equal to or more than 80%, and still more preferably equal to or more than 90%, in terms of ensuring a necessary level of mechanical strength of the optically anisotropic film, and of preventing any unreacted substance from leaking out into the liquid crystal layer or the like. In order to improve the rate of polymerization reaction, it may be effective to increase the energy of irradiation of ultraviolet radiation to be irradiated, or to proceed the polymerization under a nitrogen atmosphere or under a heating condition. Other methods adoptable herein include a method of once allowing the composition to polymerize, and further allowing the reaction to proceed based on a heat polymerization reaction by keeping the composition at a temperature higher than the initial polymerization temperature, and a method of irradiating ultraviolet radiation once again. The rate of polymerization reaction may be measured by comparing absorbance of polymerizable binding group in infrared vibration spectrum, before and after the polymerization.

(Polymerizable Monomer)

The liquid crystal composition may contain polymerizable monomer. The polymerizable monomers adoptable in combination with the liquid crystal compound are not specifically limited, so far as they do not induce any changes in the tilt angle of the liquid crystal compound, or do not extremely inhibit alignment of the liquid crystal compound. Among these, monomers having a polymerization-active ethylenic unsaturated group, such as vinyl group, vinyloxy group, acryloyl group and methacryloyl group, may preferably be used.

Content of the polymerizable monomer generally falls in the range from 0.5 to 50% by mass relative to the liquid crystal compound, and more preferably in the range from 1 to 30% by mass. Use of a monomer having two or more reactive functional groups is expected to improve adhesiveness between the alignment film and the optically anisotropic film, typically for the case where the optically anisotropic film is formed on the surface of the alignment film.

(Chiral Agent)

The liquid crystal composition for forming the optically anisotropic film may contain at least one species of chiral agent. Use of the liquid crystal composition containing the chiral agent successfully induces expression of structures of twisted inclined alignment and twisted hybrid alignment. The chiral agent adoptable to the present invention may be any of publicly-known chiral agents (described for example in "*Ekisho Debaisu Handobukku* (The Handbook of Liquid Crystal Devices)", Chapter 3, Section 4-3, "Chiral Agent for TN and STN", edited by the 142nd Committee of Japan Society for the Promotion of Science, p. 199, 1989).

The chiral agent generally contains an asymmetric carbon atom, but also an axially chiral compound or a planar chiral compound, which contain no asymmetric carbon atom, may be adoptable as the chiral agent. Examples of the axially chiral compound and planar chiral compound include binaphthyl, helicene, paracyclophane, and derivatives of these compounds. The chiral agent may have also liquid crystallinity, and even the liquid crystal compound of the present invention may act also as the chiral agent.

The amount of use of the chiral agent is preferably from 0.001 to 10 mol % of the liquid crystal compound. A smaller amount of use of the chiral agent is more preferable, since the smaller amount is often less affective to the liquid crystallinity. Accordingly, the chiral agent is preferably those having a large force of twisting. As the chiral agent having such strong force of twisting, those described in Japanese Laid-Open Patent Publication No. 2003-287623 may be adoptable.

(Solvent for Coating)

The liquid crystal composition may be prepared in a form of coating liquid. Organic solvents may preferably be used as a solvent for preparing the coating liquid. Examples of the organic solvent include amides (for example, N,N-dimethylformamide), sulfoxides (for example, dimethylsulfoxide), heterocyclic compounds (for example, pyridine), hydrocarbons (for example, toluene, hexane), alkyl halides (for example, chloroform, dichloromethane), esters (for example, methyl acetate, butyl acetate), ketones (for example, acetone, methyl ethyl ketone, methyl isobutyl ketone, cyclohexanone), and ethers (for example, tetrahydrofuran, 1,2-dimethoxyethane). Alkyl halides, esters and ketones are preferable. Two or more species of organic solvent may be used in combination.

[Alignment Layer]

As described in the above, the optically anisotropic film may be formed using an alignment layer. The alignment layer functions to determine the direction of alignment of the liquid crystalline compound formed thereon. The alignment layer may be any layer so far as it can impart alignability to the optically anisotropic film. Preferable examples of the alignment layer include a rubbed layer of organic compound (or polymer), inorganic obliquely-deposited film, layer of photo-isomerizable compound irradiated by polarized light or obliquely irradiated by natural light, layer having microgrooves, self-assembled film of w-tricosanoic acid, dioctadecylmethylammonium chloride and methyl stearate formed by Langmuir-Blodgett method (LB film), and layer obtained by aligning dielectric under applied electric field or magnetic field.

The alignment layer may be formed preferably by using polymer. Species of polymer adoptable herein may be determined depending on alignment of the liquid crystalline compound (in particular, mean tilt angle). For example, a polymer (general polymer used for alignment) unlikely to lower the surface energy of the alignment layer may be adoptable, for the purpose of horizontally aligning the liquid crystalline compound. Specific examples of species of polymers are described in various literatures, in conjunction with liquid crystal cell or optical compensation sheet. Examples of the polymer include polymers such as polymethylmethacrylate, acrylic acid/methacrylic acid copolymer, styrene/maleimide copolymer, polyvinyl alcohol, poly(N-methylol acrylamide), styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxy methylcellulose, polyethylene, polypropylene and polycarbonate; and compounds such as a silane coupling agent. Preferable examples of the polymer are polyimide, polystyrene, polymer of styrene derivative, gelatin, polyvinyl alcohol, alkyl (preferably $C_6$ or longer alkyl)-modified polyvinyl alcohol poly-vinyl alcohol or modified polyvinyl alcohol, poly acrylic acid or copolymer with poly acrylate, polyvinyl pyrrolidone, and cellulose or modified cellulose. Materials for composing the alignment layer may have a functional group capable of reacting with a reactive group of the liquid crystalline compound. The functional group may be introduced by introducing a repeating unit which has the functional group in the side chain thereof, or as a substituent of a cyclic group. The alignment layer is preferably capable of forming a chemical bond with the liquid crystalline compound at the interface therebetween. This sort of alignment layer is described in Japanese Laid-Open Patent Publication No. 9-152509. Modified polyvinyl alcohol having acryl groups introduced into the side chains thereof, using acid chloride and Karenz MOI (from Showa Denko K.K.) is particularly preferable. The thickness of the alignment layer is preferably from 0.01 to 5 μm, and more preferably from 0.05 to 2 μm.

Also polyimide film (preferably fluorine-containing polyimide film) which has widely been used as an alignment layer of LCD is preferable as the organic alignment layer. The film may be obtained by coating a polyamic acid (for example, LQ/LX Series from Hitachi Chemical Co., Ltd., SE Series from Nissan Chemical Industries, Ltd.) onto the surface of a support, followed by sintering at 100 to 300° C. for 0.5 to 1 hour, and rubbing. The rubbing may be proceeded by methods which have widely been adopted to process of aligning liquid crystal of LCD. More specifically, methods adoptable herein may be such as achieving alignment by unidirectionally rubbing the surface of the alignment layer using paper, gauze, felt, rubber, nylon fiber, polyester fiber or the like. In general, the rubbing is proceeded by a motion, repeated several times, of cloth averagely fluffed with fibers having uniform length and thickness.

Materials to be deposited for forming the inorganic obliquely-deposited film may be represented by SiO, and exemplified also by metal oxides such as $TiO_2$ and $ZnO_2$, fluorides such as $MgF_2$, and metals such as Au and Al. Any metal oxides may be adoptable as the material to be deposited by oblique vapor evaporation, without being limited to those described in the above, so far as they have large dielectric constant. The inorganic obliquely-deposited film may be formed using a vacuum evaporation apparatus. The inorganic obliquely-deposited film may be formed by vacuum evaporation while keeping a film (support) stationary, or by continuously feeding a web film.

Compounds adoptable to the method of using a photo-isomerizable compound to be irradiated by polarized light or to be obliquely irradiated by natural light are preferably azo-base liquid crystalline compound or polymer, and cinnamoyl-base compound, by virtue of their high sensitivity to light. The compounds may be sensitized by optionally adding a photo-sensitizer or the like. Any compounds having anisotropy induced therein by photo-assisted isomerization or dimerization, and capable of allowing themselves to function as the alignment film may preferably be used. In particular for the case where the alignment layer is necessarily formed over a matrix structure, intrinsically having portions which cannot be rubbed due to partitions formed therein, or over a color filter having a large surface irregularity, use of the photo-assisted alignment film is preferable.

[Support]

The optically anisotropic film of the present invention may be formed on a support. For the case where the optically anisotropic film is intended to be used in the liquid crystal display device, the film may be formed on the glass substrates of the liquid crystal cell, on the color filter in the cell, or on the overcoat (OC) layer, directly thereon or while placing the alignment layer in between. On the other hand, the optically anisotropic film may be formed on a transparent support such as polymer film, and may be used while being bonded together with the support to any other component in the liquid crystal display device. Alternatively, the optically anisotropic film may be formed on a support, and then transferred onto the surface of any other component in the liquid crystal display device. For the case where the support is used in a stacked form with the optically anisotropic film in the liquid crystal display device, the support is preferably light transmissive, specifically having a light transmittance of 80% or larger. For the case where the support is used in a stacked form, the support composed of polymer film or the like may be used also as a protective film for the polarizing plate. For the case where the support is used also as the protective film for the polarizing film, the support is preferably a polymer film. Specific examples of the polymer film include those composed of cellulose esters (for example, cellulose diacetate, cellulose triacetate), norbornene-base polymers and poly(meth)acrylate esters, allowing use of a variety of commercially-available polymers. Among these, the cellulose esters are preferable, and lower aliphatic acid esters of cellulose are more preferable, in view of optical characteristics. The lower aliphatic acid herein means aliphatic acids having 6 or smaller number of carbon atoms, wherein the number of carbon atoms is preferably 2 (cellulose acetate), 3 (cellulose propionate) or 4 (cellulose butyrate). Cellulose triacetate is particularly preferable. Alternatively, also mixed aliphatic esters such as cellulose acetate propionate and cellulose acetate butyrate may be used. Still alternatively, even polymers, having conventionally been known to readily express birefringence, such as polycarbonate and polysulfone, may be adoptable after being reduced in the expressivity of birefringence by modifying the polymers with molecules described in the Pamphlet of International Patent WO00/26705.

The support may be optically isotropic, or may be anisotropic. It is also allowable to use a retardation layer, which has an optical compensation function such as a second optically anisotropic layer described later, as the support. The thickness of the polymer film used as the support generally falls in the range from 5 to 500 µm, preferably in the range from 20 to 250 µm, more preferably in the range from 30 to 180 µm, and particularly preferably in the range from 30 to 110 µm.

[First Embodiment of Liquid Crystal Display Device of the Present Invention]

A first embodiment of the liquid crystal display device of the present invention will be explained referring to the attached drawings. FIG. 1 is a schematic sectional view illustrating an exemplary liquid crystal display device of the present invention. A reflective/transmissive-type liquid crystal display device illustrated in FIG. 1 has a multi-gap liquid crystal cell, where the portions having a small gap are used as a reflective display area, and the portions having a large gap are used as a transmissive display area. The cell gap of the reflective display area is set to approximately twice as large as that in the transmissive display area.

The liquid crystal display device illustrated in FIG. 1 has, in this order as viewed from the observer's side, a linear polarizing plate 1 on the observer's side, a retardation film 2, a substrate 3, a color filter 4 in the transmissive area, a color filter 5 in the reflective area, a black matrix 6, an overcoat layer 7, a liquid crystal layer 8 having different thickness in the transmissive area and in the reflective area, a reflector plate 9 composed of aluminum or the like, a substrate 10, a second optically anisotropic layer 13, a first optically anisotropic layer 14 composed of the optically anisotropic film of the present invention, and a polarizing plate 12 on the back light side. Although not illustrated in the drawing, there are disposed, below the polarizing plate 12 on the back light side, a back light unit which is composed of a light source, a light guide plate, a prism sheet, a diffuser plate, and a reflector plate disposed behind the light guide plate. If necessary, it is also allowable to provide, between the polarizing plate 12 on the back light side and the back light unit, a polarization reflector plate which is typically composed of a birefringence layer and an isotropic refractive index layer stacked so as to have an optical thickness of λ/4, or a polarization reflector plate which is composed of a cholesteric liquid crystal and a λ/4 retardation plate.

First, the reflective display area will be explained. The external light is converted to circular polarized light by the polarizing plate 1 on the observer's side and the retardation film 2, allowed to pass through the liquid crystal layer 8, reflected on the reflector plate 9 which serves also as an electrode, and again allowed to pass through the liquid crystal layer 8. Since the state of circular polarization of the reflected light varies depending on voltage applied to the liquid crystal in this process, so that intensity of light allowed to pass through the polarizing plate 1 on the observer's side may be modulated. For example, retardation in plane Re of the liquid crystal layer 8 may be set to 50 nm or smaller in the black state, and 100 nm or larger in the white state. If retardation in plane Re of the liquid crystal layer 8 is equal to or smaller than 50 nm, the sense of circular polarization is inverted by the reflector plate 9, so that the light can no more transmit through the polarizing plate 1 on the observer's side, to thereby give the black state. On the other hand, if the Re of the liquid crystal layer 8 is equal to or more than 100 nm, the state of circular polarization of light transmitted through the liquid crystal layer 8 becomes similar to that of the incident light, so that the circular polarized light is converted to linear polarized light by the retardation film 2, allowed to pass through the polarizing plate, to thereby give bright display.

Retardation may be adjustable by applying voltage to the liquid crystal layer 8, so as to make the tilt angle of the liquid crystal in the liquid crystal layer 8 larger in the black state than in the white state.

On the other hand, in the transmissive display area, the light coming from the back light is converted to linear polarized light after passing through the polarizing plate 12 on the back light side, and then converted to circular polarized light after passing through the first optically anisotropic layer 14 and the second optically anisotropic layer 13. The circular polarized light passes through the substrate 10, and then enters the liquid crystal layer 8. The light which entered the liquid crystal layer 8 is varied in the state of polarization by the voltage applied to the liquid crystal layer, allowed to pass through the color filter 4 in the transmissive area, and again varied in the state of polarization by the retardation film 2, absorbed by the linear polarizing plate 1 on the observer's side to a degree depending on the state of polarization, or allowed to transmit therethrough, to reach the observer's side. For example, if retardation in plane Re of the liquid crystal layer 8 in the white state is set approximately twice as large as that in black state as described in the above, in the black state, the light is absorbed by the polarizing plate 1 on the observer's side without impairing the state of polarization of the incident light, meanwhile in the white state, the circular polarized light passed through the liquid crystal layer 8 is inverted in the sense, and is allowed to pass through the polarizing plate 1 on the observer's side.

Retardation in plane Re of the first optically anisotropic layer 14 measured at 550 nm is preferably from 80 nm to 160 nm, more preferably from 100 nm to 150 nm, and still more preferably from 110 nm to 140 nm, in terms of elevating the axial contrast.

The first optically anisotropic layer 14 is composed of the optically anisotropic film of the present invention. Since the optically anisotropic layer is formed by obliquely aligning and fixing the liquid crystal compound which exhibits reversed wavelength dispersion characteristics of Δn, so that also the first optically anisotropic layer 14 exhibits reversed wavelength dispersion characteristic of Re. Since the color filter of the individual colors allow to pass light having a wavelength distribution characterized by a half-value width of 100 nm to 150 nm or around, so that complete color compensation cannot be achieved if an optically anisotropic layer which exhibits regular wavelength dispersion characteristics of Re is used in place of the first optically anisotropic layer 14. In contrast, by using the optically anisotropic film of the present invention which exhibits reversed wavelength dispersion characteristics as the first optically anisotropic layer 14, almost complete color compensation may be achieved. The first optically anisotropic layer 14 is preferably designed to express almost same values of phase angle difference, with respect to the center wavelengths of the individual colors of color filters.

The first optically anisotropic layer 14, prepared using the above-described liquid crystal compound and according to the above-described method of preparing, may directly be bonded to the liquid crystal display device together with the support, while placing a pressure-sensitive adhesive of regular adhesive in between, or only the optically anisotropic layer 14 may be transferred onto the substrate of the liquid crystal display device, or onto the retardation plate provided on the substrate. Alternatively, the support provided with the optically anisotropic layer 14 may be used as the protective film of the polarizing plate, wherein it may be used while being bonded to the liquid crystal display device. Still alternatively, the first optically anisotropic layer 14 may be formed by direct coating and fixing onto the substrate of the liquid crystal display device, using an ink-jet system described later.

The second optically anisotropic layer 13 has a function of compensating birefringence of the liquid crystal in the black state of the liquid crystal layer 8, and effectively expands the viewing angle for ensuring good contrast. The second optically anisotropic layer 13 has retardation along the thickness direction Rth at 550 nm of 40 nm to 150 nm, and retardation in plane Re at 550 nm of 0 nm to 20 nm. Retardation along the direction Rth of the second optically anisotropic layer at 450 nm preferably shows regular wavelength dispersion. More specifically, Rth(450 nm) and Rth(550 nm) preferably satisfy numerical expression (5) below in terms of compensation of the liquid crystal layer, and more preferably satisfy numerical expression (6):

$$Rth(450 \text{ nm})/Rth(550 \text{ nm}) > 1 \quad (5); \text{ and}$$

$$1.2 > Rth(450 \text{ nm})/Rth(550 \text{ nm}) > 1 \quad (6)$$

The second optically anisotropic layer 13 may be adoptable without being limited by materials, so far as the above-described optical characteristics are satisfied. For example, films obtained by biaxially stretching polymer films such as those composed of polycarbonate, norbornene and so forth, and films obtained by allowing discotic liquid crystal to horizontally align and by fixing them, may be adoptable. Alternatively, the layer may be formed by mixing a compound, which expresses the above-described optical characteristics, to a polymer film composed of cellulose acylate or the like. By using the second optically anisotropic layer 13 as the support, and by forming thereon the first optically anisotropic layer 14, number of steps of preparing may be reduced.

The first optically anisotropic layer 14, illustrated in FIG. 1 so as to be disposed between the back light polarizing plate 2 and the substrate 10, may alternatively be disposed between the substrate 3 and the polarizing plate 1 on the observer's side, or may be disposed at both positions. The configurations are contributive to reduce the number of layers to be used. On the other hand, the second optically anisotropic layer 13 illustrated in FIG. 1 is disposed between the liquid crystal layer 8 and the first optically anisotropic layer 14, that is, conforming to order of the liquid crystal layer 8, the second optically anisotropic layer 13, and the first optically anisotropic layer 14. The second optically anisotropic layer 13 may alternatively be disposed so as to hold the liquid crystal layer 8 between itself and the first optically anisotropic layer 14, that is, conforming to the order as viewed from the observer's side of the second optically anisotropic layer 13, the liquid crystal layer 8 and the first optically anisotropic layer, or conforming to the order of the first optically anisotropic layer 14, the liquid crystal layer 8 and the second optically anisotropic layer 13.

[Second Embodiment of Liquid Crystal Display Device of the Present Invention]

FIG. 2 is a schematic sectional view illustrating an exemplary liquid crystal display device of a second embodiment. The liquid crystal display device of this embodiment has a multi-gap liquid crystal cell, where the portions having a small gap are used as the reflective display area, and the portions having a large gap are used as the transmissive display area, similarly to as in the first embodiment illustrated in FIG. 1. A different point from the first embodiment resides in that the first optically anisotropic layer is disposed between a pair of substrate 3 and substrate 10. The second embodiment relates to a so-called, in-cell-type liquid crystal display device. Also in this embodiment, the second optically anisotropic layer 13 may optionally be disposed between the first optically anisotropic layer and the liquid crystal layer, although not illustrated in the exemplary configuration illustrated in FIG. 2.

Modulation of the external light in the reflective display area is same as explained referring to FIG. 1, so that the explanation will not be repeated.

Also modulation of the light coming from the back light in this embodiment is same as described in the above, but with an improved efficiency of use of light. More specifically, the incident light coming from the back light passes through the polarizing plate 12 on the back light side and the substrate 10, a portion of the light is then reflected on the back surface of the reflector plate 9 provided in the reflective display area, while keeping the state of linear polarization, and is returned back to the back light side to be recycled, without being absorbed by the polarizing plate 12 on the back light side. In the conventional reflective/transmissive-type liquid crystal display devices (for example, liquid crystal display devices disclosed in Patent Documents 1 and 2), having the retardation film disposed between the reflector plate and the polarizing plate on the back light side, the state of polarization changed by 180° and were absorbed by the polarizing plate 12 on the back light side. In contrast in this embodiment, the light may be recycled, to thereby improve the efficiency of use of light.

Also in this embodiment, the first optically anisotropic layer 14 is composed of the optically anisotropic film of the present invention. More specifically, since the optically anisotropic layer is formed by obliquely aligning and fixing the liquid crystal compound which exhibits reversed wavelength dispersion characteristic of Δn, so that also the first optically anisotropic layer 14 exhibits reversed wavelength dispersion characteristics of Re. As a consequence, as described in the above, almost complete color compensation may be achieved by the color filters of the individual colors, when the light having a wavelength distribution characterized by a half-value width of 100 nm to 150 nm or around is allowed to pass therethrough.

Since the first optically anisotropic layer 14 in the second embodiment is disposed corresponding to patterns of the individual colors of the color filter 4, so that, for the case where the wavelength dispersion characteristics of Re of the first optically anisotropic layer 14 falls out of an optimum range and needs some adjustment, the thickness of the first optically anisotropic layer 14 may locally be varied so as to make the Re values fall in the optimum ranges for the individual colors. Since the first optically anisotropic layer 14 is composed of the optically anisotropic film of the present invention, so as to adjust the wavelength dispersion characteristics of Re to a certain degree by virtue of the liquid crystal compound, so that the color filter may reduce difference in the thickness varied from color to color, and thereby a process of planarizing the surface irregularity ascribable to the difference in height may be made easier.

In the second embodiment, the first optically anisotropic layer 14 is formed only in the transmissive display area of the liquid crystal display device. This way of formation may successfully disuse two polarizing plates which have conventionally been disposed between the polarizing plate on the back light side and the substrate. As a consequence, not only the cost may be reduced, but also the luminance in the transmissive display may be improved, since the light reflected on the reflector plate may be returned back to the back light side to be recycled, without being absorbed by the polarizing plate. The first optically anisotropic layer 14, formed on the in-cell surface of the substrate 10 on the back light side in the example illustrated in FIG. 2, may alternatively be formed on the in-cell surface of the polarizing plate 3 on the observer's side. In the exemplary case illustrated in FIG. 2, the first optically anisotropic layer 14 is preferably located between the substrate 10 and a transparent electrode (not illustrated). For the case where the first optically anisotropic layer 14 is formed on the in-cell surface of the substrate 3 on the observer's side, the layer is preferably disposed between the substrate 3 and the color filter 4, or between the color filter 4 and the transparent electrode (not illustrated), because the film may conveniently be partitioned making use of the black matrix 6 and so forth.

In the second embodiment, the first optically anisotropic layer 14 may be formed by jetting a fluid, which contains the liquid crystalline compound which satisfies the mathematical expression (1), through an ink-jet-type jetting head to the transmissive area, followed by drying to form a liquid crystal phase, and light exposure. According to the method, the first optically anisotropic layer 14 may be formed precisely at the positions corresponded to the color filters, the transmissive area and the reflective area. Of course, the system may be adoptable also to the formation of the first optically anisotropic layer 14 in the first embodiment. The system raises an advantage over other system of formation, in that loss of coating liquid of the liquid crystal may be reduced.

The method of forming the first optically anisotropic layer based on the ink-jet process will now be detailed.

First, a glass substrate with a black matrix, having the surface of which made ink-repellent, typically by plasma treatment using a gas which contains F atoms ($CF_4$, for example), is obtained. A fluid such as solution containing the liquid crystalline compound is then jetted using an ink-jet device to the fine regions partitioned by the black matrix, to thereby form a layer composed of the fluid in the fine regions. The fluid contains at least one species of liquid crystalline compound which satisfies the mathematical expression (1), and is prepared so as to form a liquid crystal phase after being dried. Any fluid may be acceptable if it can be jetted by the ink-jet process, and the fluid is preferably solution, although dispersion having a part of, or entire portion of the material dispersed therein is also acceptable. After completion of jetting of the solution, the resultant layer of solution is dried to produce a liquid crystal phase therein, and the layer is subjected to light exposure to thereby form the first optically anisotropic layer. The layer may optionally be heated in the process of forming the liquid crystal phase, wherein a heating device may be adoptable.

For the case where the first optically anisotropic layer is formed on the in-cell surface of the substrate on the observer's side (the substrate 3 in FIG. 2), the second jetting of ink liquid for forming the color filter may be carried out on the optically anisotropic layer formed as described in the above, the ink liquid is dried, and optionally subjected to light exposure, to thereby form the color filter layer in the transmissive area. Also the color filter layer in the reflective area may be formed similarly by the ink-jet process. Thereafter, a planarizing layer (overcoat layer 7 in FIG. 2) may optionally be formed on the color filter layer.

Alternatively, the first optically anisotropic layer may be formed on the color filter layer (color filter layer 4 in FIG. 2) in the transmissive area. The first optically anisotropic layer in this case may be formed similarly by the ink-jet process, after the color filter layer is formed typically by the ink-jet process.

Jetting conditions of ink or the like in the process of forming the first optically anisotropic layer are not specifically limited. If the viscosity of the fluid for forming the optically anisotropic layer is large, the ink may be jetted preferably after being reduced in the viscosity at room temperature or under heating (at 20 to 120° C., for example), in view of jetting stability. Since fluctuation in the viscosity of the ink or the like largely and directly affects the size of liquid droplet and rate of jetting, and consequently degrades the image quality, so that the temperature of the ink or the like is preferably kept at constant as possible.

The same will apply also to the process of forming the color filters in the transmissive area and in the reflective area (the color filter layers 4 and 5 in FIG. 2) by the ink-jet process.

An ink-jet head (simply referred to as "head", hereinafter) used in the above-described method adoptable herein may be any of publicly-known one, without special limitation, such as those of continuous type and dot-on-demand type. Of the dot-on-demand-type heads, a thermal head preferably has a working valve for jetting, as described in Japanese Laid-Open Patent Publication No. 9-323420. As a piezoelectric head, those described in European Patents A277,703 and A278, 590, for example, may be adoptable. The head preferably has a temperature control function, for the convenience of managing temperature of the composition. The temperature of jetting is preferably set so as to adjust the viscosity in the process of jetting to 5 to 25 mPa·s, and thereby the temperature of the composition is controlled so as to allow a range of fluctuation in the viscosity of ±5%. The working frequency is preferably 1 to 500 kHz.

Before the first optically anisotropic layer is formed, the alignment layer may be formed by coating a material, expected to form the alignment film, such as polyvinyl alcohol, polyamic acid, soluble polyimide and so forth described in the above, drying the resultant film, and optionally subjecting the surface of the film to alignment treatment such as rubbing. Thereafter the liquid is jetted onto the rubbed surface, to thereby form the first optically anisotropic layer. Alternatively, also a photo-alignable film, capable of inducing therein monoaxial alignability with the aid of oblique irradiation of polarized ultraviolet radiation or regular ultraviolet radiation, may preferably be used. The alignment layer may be formed by the ink-jet process similarly to the retardation layer, or may be formed by other methods.

The method of forming the first optically anisotropic layer in the second embodiment, and the methods of forming the color filter layer in the first and second embodiments are not limited to the ink-jet process, and may of course be printing process, for example.

[Alignment and Disposition of First Optically Anisotropic Layer]

In one preferable embodiment of the liquid crystal display device of the present invention, the mean direction of axes of the directors of the liquid crystal molecules in the liquid crystal cell in the black state, projected onto a surface parallel to the layer, lies substantially parallel to the direction of the director of the liquid crystalline compound in the first optically anisotropic layer, projected onto a surface parallel to the layer. Note that "substantially parallel to" in the present invention means that angular difference between two above-described directions is −10° or larger and smaller than 10°, preferably −5° or larger and smaller than 5°, and more preferably −3° to 3°. The director of the liquid crystalline compound in the liquid crystal cell may be adjustable in a desired direction, depending on the direction of rubbing of the alignment films provided to the opposed surfaces of the substrates. It is also preferable to adjust the mean direction of inclination of the liquid crystalline compound in the first optically anisotropic layer, to an azimuth of 180° relative to the azimuth of inclination of the liquid crystal molecules in the liquid crystal cell in the black state. By virtue of combination of disposition, retardation dependence in oblique directions in the black state may be reduced, and thereby the viewing angle for ensuring good contrast may be widened.

[Substrate]

The liquid crystal cell substrates adoptable to the liquid crystal display device of the present invention may be any substrates composed of various materials, having conventionally been used as the substrates for the liquid crystal cell, without special limitation. For example, metallic support, metal-laminated support, and those composed of glass, ceramic, synthetic resin film and so forth may be adoptable. Particularly preferable examples include those composed of glass and synthetic resin film, which are excellent in transparency and dimensional stability.

[Color Filter Layer]

The color filter is generally composed of R, G and B color filter portions, and a black matrix as a light interceptor. In the reflective/transmissive-type devices, the color filter in the reflective area, through which light passes twice, is formed so as to have an absorption density lower than that of the color filter formed in the transmissive area. Alternatively, the density of the reflective area may be lowered as a whole, also by forming a transparent resist layer in a part of area in which the color filter has been formed, and by forming the color filter layer allowing transmission therethrough in the residual area.

The color filter layer may be formed by jetting a colorant composition using an ink-jet device, directly between the partitions. Alternatively, the conventional method of repeating coating of a colorant, light exposure according to a predetermined pattern and development, may be adoptable. The overcoat layer may optionally be formed on the color filter layer. The overcoat layer is used for supplementing flatness in view of appearance, and moisture resistance and chemical resistance in view of durability of the color filter layer, and for ensuring barrier performance against leachate from the color filter layer. Materials preferably adoptable therefor include transparent resins such as thermo-setting, maleimide-containing acrylic copolymer, and epoxy resin composition.

[Liquid Crystal Layer]

Operation and alignment modes of the liquid crystal layer in the liquid crystal display device of the present invention include various types such as TN (Twisted Nematic) mode, STN (Super Twisted Nematic) mode, ECB (Electrically Controlled Birefringence) mode, IPS (In-Plane Switching) mode, VA (Vertical Alignment) mode, MVA (Multidomain Vertical Alignment) mode, PVA (Patterned Vertical Alignment) mode, OCB (Optically Compensated Birefringence) mode, HAN (Hybrid Aligned Nematic) mode, ASM (Axially Symmetric Aligned Microcell) mode, Half-tone gray scale mode, Multi-domain partitioning mode, and any modes employing ferroelectric liquid crystal or antiferroelectric liquid crystal. The drive system of the liquid crystal cell is also not limited; and any of passive matrix system adopted to STN-LCD and so forth; active matrix system making use of active electrodes such as those for TFT (Thin Film Transistor), TFD (Thin Film Diode) and so forth; and plasma address system, may be adoptable. TN system, STN system, ECB system, VA system, MVA system, PVA system, OCB system, HAN system, and ASM system are more preferably adoptable to the liquid crystal display device of the present invention, since they show larger tilt angle of liquid crystal in the black state than in the white state.

The liquid crystal display device of the present invention may be configured without being limited to those illustrated in FIG. 1 and FIG. 2, and may have any other components, so far as the effects of the present invention may not be impaired. For the purpose of converting circular polarized light into linear polarized light, or converting linear polarized light into circular polarized light, a wide-band λ/4 plate may be used between the polarizing plate on the observer's side and the liquid crystal cell, or between the polarizing plate on the back light side and the liquid crystal cell. In order to achieve wide-band performance, a single retardation plate may be used, or two or more retardation plates having different degrees of retardation or angles of slow axes may be combined. In view of obtaining wide-band performance, an optical film having small wavelength dispersion may preferably be used as the retardation plate. Specific examples of materials composing the retardation plate may include liquid crystalline film and stretched polymer film. Examples of the stretched polymer film adoptable herein include those composed of monoaxial or biaxial polymer substances, such as polycarbonate (PC), polymethacrylate (PMMA), polyvinyl alcohol (PVA), and norbornene-base polymers. For example, from the viewpoint of smallness in wavelength dispersion, monoaxially stretched ARTON film (from JSR Corporation) may preferably be used. When two or more retardation plates are combined, circular polarization may be obtained over the entire range of the visible light region, or a wide-band λ/4 plate may be achieved, by adjusting the angle between the slow axis of a λ/4-retardation plate and the slow axis of a λ/2-retardation plate to 60°, the angle between the slow axis of the λ/4-retardation plate and the axis of polarization (inplane direction along which a maximum transmittance appears) of a polarizing film to 75°, and the angle between the slow axis of the λ/2-retardation plate and the axis of polarization of the polarizing film to 15°. Another preferable combination is such as adjusting the angle between the slow axis of the λ/4-retardation plate and the slow axis of the second optically anisotropic layer to 60°, the angle between the slow axis of the λ/4-retardation plate and the axis of polarization of the polarizing film to 15°, and the angle between the slow axis of the λ/2-retardation plate and the axis of polarization of the polarizing film to 75°. The allowable range of the above-described angles falls within ±10°, preferably within ±8°, more preferably within ±6°, still more preferably within ±5°, and furthermore preferably within ±4°.

EXAMPLES

The present invention will be explained to further detail, referring to Examples. Note that the materials, reagents, amounts and ratios of substances, operations and so forth explained in Examples below may appropriately be modified without departing from the spirit of the present invention. The scope of the present invention is, therefore, not limited to the specific examples described below.

[Preparation of Exemplary Compound (2)]

Exemplary compound (2) was prepared according the scheme below.

[Formula 24]

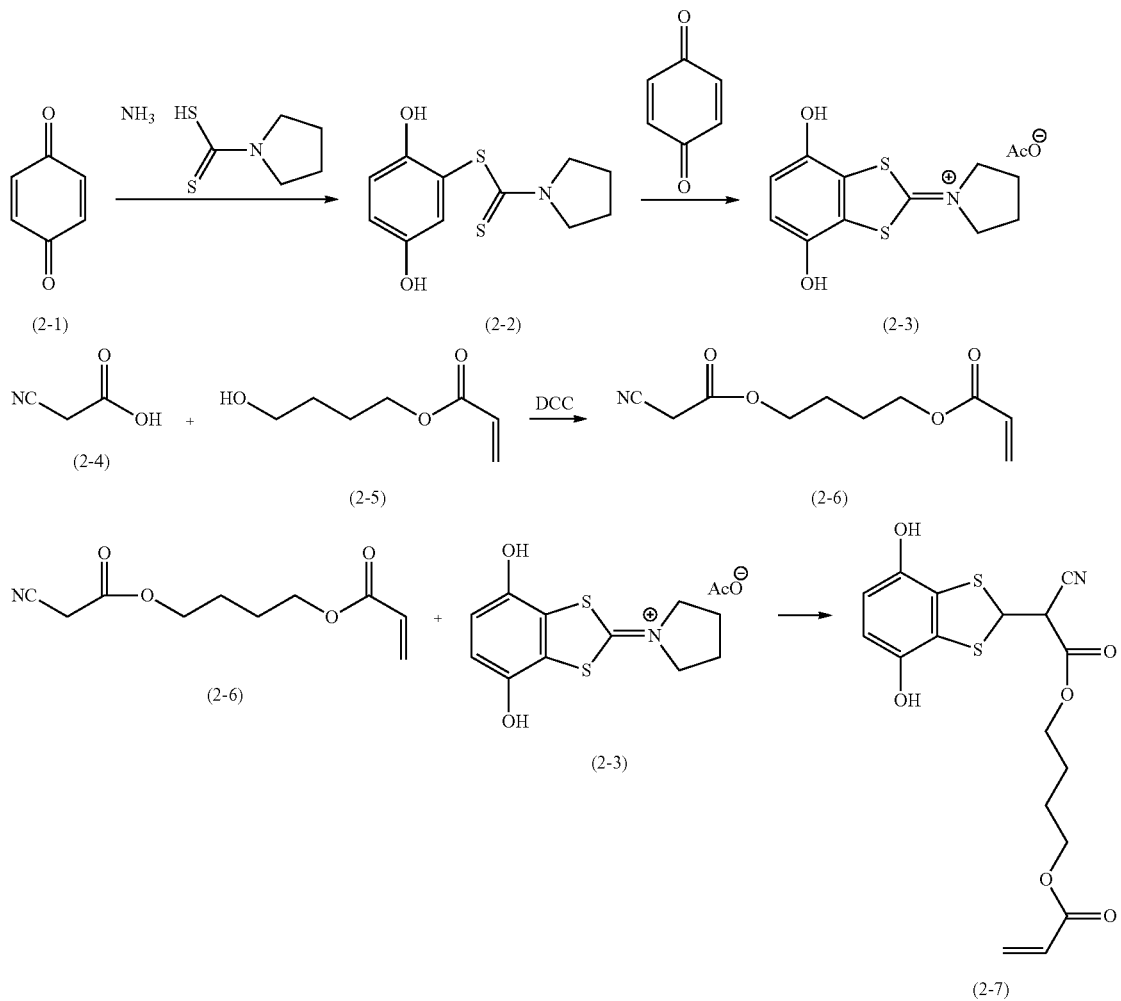

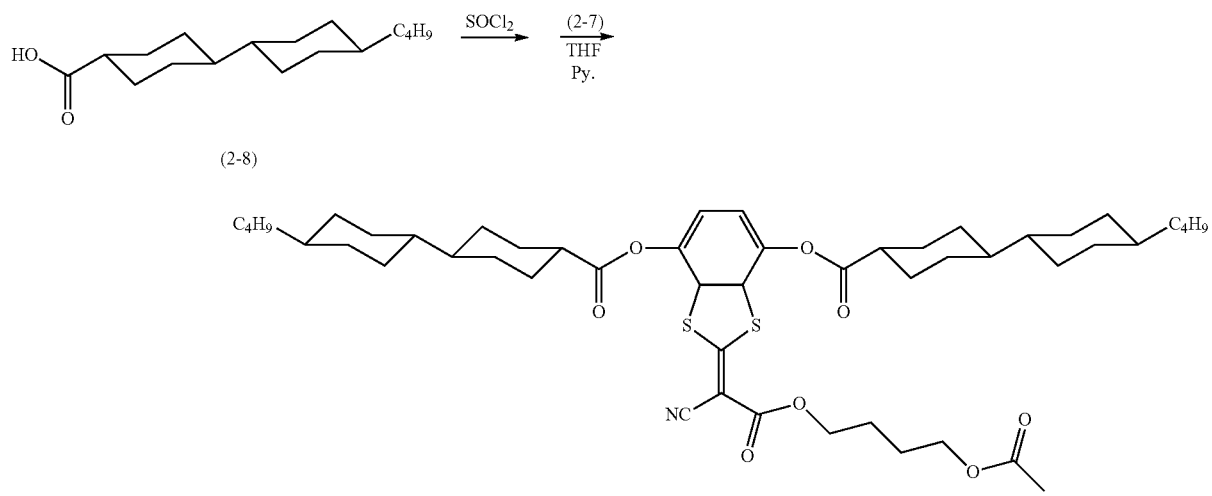

Exemplary compound (2)

Synthesis from compound (2-1) to compound (2-3) was carried out according to procedures described in "Journal of Chemical Crystallography" (1997), 27(9), p. 515-526.

To 50 ml of tetrahydrofuran solution containing 8.5 g (0.1 mol) of cyanoacetic acid (2-4) and 14.4 g (0.1 mol) of 4-hydroxybutylacrylate (2-5) cooled on an ice bath, 20.6 g (0.1 mol) of dicyclohexylcarbodiimide (DCC) was dropwisely added. The mixture was heated to room temperature, stirred for 2 hours at the temperature, and then filtered to remove a solid matter. The solvent in the filtrate was vaporized off under reduced pressure, and a solid matter produced therein was filtered off, to thereby obtain 18.6 g of compound (2-6) (yield 88 mol %).

One hundred milliliters of suspension liquid of N-methyl-2-pyrrolidone (NMP) containing 15.7 g (50 mmol) of compound (2-3), 12.7 g (60 mmol) of compound (2-6), and 50 mg of Irganox 1010 (trade name, from CIBA Specialty Chemicals, Inc.) was heated to 80° C. The suspended liquid after being confirmed to become a uniform liquid, was stirred for 1.5 hours, and then cooled. The liquid was added with ethyl acetate and water in a separating funnel, and the organic layer was washed with water, 0.5 N aqueous HCl solution, and water, in this order. The organic layer was dried over magnesium sulfate, and the solvent was vaporized off under reduced pressure. The residue was purified by silica gel column chromatography, to thereby obtain the 12.8 g of compound (2-7) (yield 65 mol %).

Twenty milliliters of toluene solution containing 17.6 g (66 mmol) of compound (2-8) was added with 11.8 g (99 mmol) of thionyl chloride and a catalytic amount of N,N-dimethylformamide. The mixture was heated to 80° C., stirred for 2 hours, and the solvent was then vaporized off. The residue was dropwisely added to 30 ml of tetrahydrofuran (THF) solution containing 11.8 g (30 mmol) of compound (2-7), 10 mg of Irganox 1010 (trade name, from CIBA Specialty Chemicals, Inc.), and 7.1 g (90 mmol) of pyridine (Py), in a nitrogen atmosphere. After the dropping, the mixture was stirred for 3 hours, and further stirred for 1 hour at room temperature. The mixture was added with ethyl acetate and water in a separating flask, and the organic layer was washed with water, 0.5N aqueous HCl solution and water, in this order. The organic layer was dried over magnesium sulfate, and the solvent was vaporized off under reduced pressure. The residue was purified by silica gel column chromatography, to thereby obtain the 20.0 g of compound (2) (yield 75 mol %).

<Identification Data of Exemplary Compound (2)>

$^1$H-NMR (CDCl$_3$, 300 MHz): 0.75-1.25 (m, 36H), 1.40-1.65 (m, 4H), 1.65-2.00 (m, 16H), 2.10-2.25 (m, 4H), 2.45-2.60 (m, 2H), 4.40-4.55 (m, 4H), 5.92 (d, 1H), 6.20 (dd, 1H), 6.50 (d, 1H), 7.21 (d, 2H)

Mass (m/z, POSI)=890

<Measurement of Liquid Crystal Characteristics and Optical Characteristics of Exemplary Compound (2)>

Exemplary compound (2) was observed under heating under a polarizing microscope, equipped with an automatic melting point measuring instrument FP-900 and FP-82HT from Mettler, and was confirmed to show a nematic liquid crystal phase in the process of elevation of temperature from 142° C. to 250° C. Compound (2) was also confirmed to show a nematic liquid crystal phase in the process of dropping of temperature from 250° C. to 90° C. The liquid crystal was also placed in a wedge-form cell preliminarily subjected to parallel alignment treatment, an interference filter was placed on the optical path, and pitches of the observed fringe patterns were measured, to thereby calculate Δn at the individual wavelengths. Δn at 150° C. was found to be 0.033 at 450 nm, 0.042 at 550 nm, and 0.045 at 650 nm, giving Δn(450 nm)/Δn(550 nm) of 0.79. Exemplary compound (2) was, therefore, confirmed to be a liquid crystal compound which satisfies numerical expression (1) in the above.

Liquid crystal compound (c) shown below was prepared.

[Formula 25]

Liquid crystal compound (c)

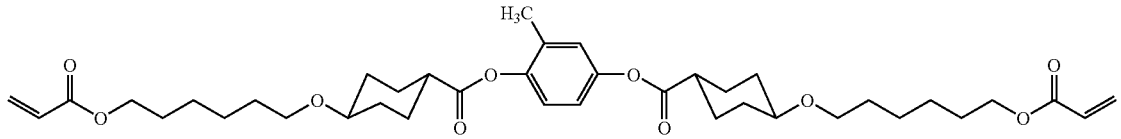

It was found from measurement of the phase transition temperatures that liquid crystalline compound (c) showed a melting point of 51° C., showed a nematic (Ne) phase in the process of elevating temperature up to 60.7° C., showed a Ne phase in the process of dropping temperature from 60.7° C. to 36.7° C., and showed a smectic A (SmA) phase at 36.7° C. and below. Measurement of wavelength dispersion of $\Delta n$, carried out at 40° C. similarly to as described in the above, gave $\Delta n(450\,nm)/\Delta n(550\,nm)=1.03$. Liquid crystalline compound (c) was, therefore, confirmed to be a liquid crystal compound which does not satisfy numerical expression (1) in the above, and which exhibits regular wavelength dispersion of birefringence $\Delta n$.

Example 1

Preparation of Optically Anisotropic Film

Commercially-available cellulose acetate film (Fujitac TD80UF, from FUJIFILM Corporation, Re=3 nm, Rth=45 nm) was saponified, a polyvinyl alcohol solution was coated and dried thereon to thereby form an alignment film, and the resultant film was then rubbed. On the film, a solution prepared by dissolving 100 parts by mass of exemplary compound (2), 0.1 parts by mass of exemplary compound (AE-3), 10 parts by mass of liquid crystal compound (c), and 4 parts by mass of polymerization initiator (trade name: Irgacure 819, from CIBA Specialty Chemicals, Inc.) in 350 parts by mass of chloroform was coated by bar coating, to thereby form a thin film. The liquid crystal composition was aligned at 130° C., and was confirmed to give a uniform alignment. The liquid crystal compound was then polymerized by irradiating ultraviolet radiation of 400 mJ/cm² at 120° C. in a nitrogen atmosphere, and then cooled to fix the state of alignment of the liquid crystal compound, to thereby form optically anisotropic film A-1. Optically anisotropic film A-1 was found to be 4.5 μm thick. In this way, retardation film 1, as a stack of a cellulose acylate film and optically anisotropic film A-1, was obtained.

It was found from measurement using an automatic birefringence analyzer (KOBRA-21ADH, trade name, from Oji Scientific Instruments) that thus-obtained optically anisotropic film A-1 showed retardation in plane Re of 95 nm at a wavelength of 450 nm, 114 nm at a wavelength of 550 nm, and 122 nm at a wavelength of 650 nm. The mean tilt angle of the liquid crystal molecules in optically anisotropic film A-1 was calculated to be 36°, by measuring Re of the sample inclined by ±40° while assuming the fast axis as the axis of rotation, and then by subtracting preliminarily-measured Re contributed by the cellulose acylate film.

Example 2

Preparation of Optically Anisotropic Film

A solution, obtained by dissolving 100 parts by mass of exemplary compound (2), 0.1 parts by mass of exemplary compound (AE-3), and 4 parts by mass of a polymerization initiator (Irgacure 819) into 350 parts by mass of chloroform, was coated by bar coating on a polyether ether ketone film which has a polyimide alignment film, already subjected to homogeneous alignment treatment, preliminarily formed thereon, to thereby form a thin film. The liquid crystal compound was aligned at a substrate temperature of 140° C., and was confirmed to give a uniform alignment. The liquid crystal compound was then polymerized by irradiating ultraviolet radiation of 400 mJ/cm² at 120° C. in a nitrogen atmosphere, and then cooled to fix the state of alignment of the liquid crystal compound, to thereby form optically anisotropic film A-2. Optically anisotropic film A-2 was found to be 4.70 μm thick.

Thus prepared optically anisotropic film A-2 was transferred from the film onto a glass plate preliminarily coated with a pressure sensitive adhesive, and then measured using an automatic birefringence analyzer (KOBRA-21ADH, trade name, from Oji Scientific Instruments). Re was found to be 94 nm at a wavelength of 450 nm, 114 nm at a wavelength of 550 nm, and 123 nm at a wavelength of 650 nm. The mean tilt angle of the liquid crystal molecules in optically anisotropic film A-2 was calculated to be 36°, by measuring Re of the sample inclined by ±40° while assuming the fast axis as the axis of rotation.

Example 3

Preparation of Reflective/Transmissive-Type Liquid Crystal Display Device

<Preparation of Polarizing Plate A Integrated with Optically Anisotropic Layer>

First, a stretched polyvinyl alcohol film was allowed to adsorb iodine, to thereby form a polarizing film. A commercially-available cellulose acetate film (Fujitac TD80UF) was saponified, and bonded to one surface of the polarizing film, using a polyvinyl alcohol-base adhesive. The retardation film 1 prepared in Example 1 was saponified on the cellulose acetate film side, and then bonded on the other surface of the polarizing film, using a polyvinyl alcohol-base adhesive, to thereby form a polarizing plate integrated with the optically anisotropic film. In this process, the optically anisotropic film A-1 and the polarizing film were bonded so that the direction of slow axis of the former and the absorption axis of the latter form an angle of 45° therebetween.

<Preparation of Liquid Crystal Display Device>

Each of a substrate having a transparent electrode film (2000 Å thick) formed on the color filter thereof, and a separately-obtained, back-light-side substrate with TFT, having a reflective electrode and the transmissive area, was provided thereon with a polyimide alignment film, and both films were subjected to anti-parallel rubbing. Next, glass beads having a particle size of 4.1 μm were scattered over the rubbed alignment film. An epoxy resin-base sealing material containing spacer particles was then printed at the position corresponded to the outer frame of the black matrix on the periphery of the pixel group of the color filter, and the color filter substrate and the back-light-side substrate were bonded under a pressure of 10 kg/cm. Next, thus-bonded glass substrates were heated at 150° C. for 90 minutes so as to cure the sealing material, to thereby obtain a substrate stack. The substrate stack was evacuated in vacuo, and then returned to the atmospheric pressure so as to allow a liquid crystal, which has a dielectric constant of +10 and a Δn of 0.086, to enter a gap between two glass substrate, to thereby form an ECB-mode liquid crystal cell.

On the observer's side of the liquid crystal cell, two sheets of norbornene stretched retardation films having retardation in plane (Re) measured at 550 nm of 250 nm and 97 nm, respectively, and a polarizing plate HLC2-2518 from Sanritz Corporation were bonded. Order of bonding was such as bonding the 97-nm retardation film onto the liquid crystal cell, the 250-nm retardation film was bonded thereon, and the polarizing plate was bonded further thereon. Assuming now that the azimuth of the absorption axis of the polarizing plate on the back light side as 0°, the slow axis of the 97-nm retardation film and the 250-nm retardation film was found to be 49° and 347°, respectively, and the azimuth of the absorption axis of the polarizing plate was found to be 151°. The direction of alignment of the liquid crystal in the liquid crystal cell was 45°. Next, the polarizing plate A integrated with the optically anisotropic layer was bonded also on the back light side of the liquid crystal cell, so as to adjust the azimuth of the slow axis of the optically anisotropic film A-1 to 225°, to thereby prepare a liquid crystal panel. In this process, the mean direction of axis of the director of the liquid crystal molecules in the liquid crystal cell in the black state, projected onto a surface in parallel with the layer, lies substantially in parallel with the direction of the director of the aligned liquid crystalline compound in optically anisotropic film A-1, projected onto a surface in parallel with the layer. Note that the direction of inclination of the aligned liquid crystalline compound in optically anisotropic film A-1 and the direction of inclination of the liquid crystal molecules in the liquid crystal layer under applied voltage are 180° different from each other.

Next, as the cold-ray-tube back light for the color liquid crystal display device, a white three-wavelength fluorescent lamp having an arbitrary hue was prepared using a green (G) phosphor made of a 50:50 mixture, on the weight basis, of $BaMg_2Al_{16}O_{27}$:Eu,Mn and $LaPO_4$:Ce,Tb, a red (R) phosphor made of $Y_2O_3$:Eu, and a blue phosphor (B) made of $BaMgAl_{10}O_{17}$:Eu. On the back light, the liquid crystal panel bonded with the polarizing plate was set, to thereby prepare an ECB reflective/transmissive-type liquid crystal display device-1.

Example 4

Preparation of ECB Reflective/Transmissive-Type Liquid Crystal Display Device

<Preparation of Retardation Film B-1 (Second Optically Anisotropic Layer)>

A commercially-available cellulose acetate film (Fujitac TD80UF) was saponified, and a polyvinyl alcohol solution was coated and dried thereon, to thereby form an alignment film. On the film, a solution, obtained by dissolving 90 parts by mass of the discotic liquid crystal compound shown below, 10 parts by mass of the monomer shown below, 1 part by mass of the tilt angle reducing agent shown below used for the air interface side, and 3 parts by mass of a polymerization initiator (Irgacure 819), into 350 parts by mass of methyl ethyl ketone, was coated by bar coating, to thereby prepare a thin film. The liquid crystal compound was aligned at 125° C., and was confirmed to give a uniform horizontal alignment. The liquid crystal compound was then polymerized by irradiating ultraviolet radiation of 400 mJ/cm² at 100° C., and then cooled, to thereby form optically anisotropic film B-1 which has the state of alignment of the liquid crystal compound fixed therein, and is composed of the optically anisotropic layer and the cellulose acetate film.

[Formula 26]

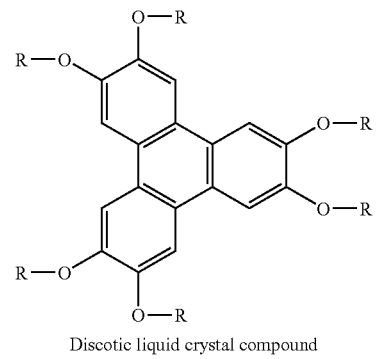

Discotic liquid crystal compound

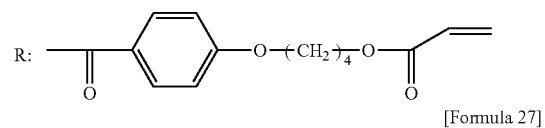

[Formula 27]

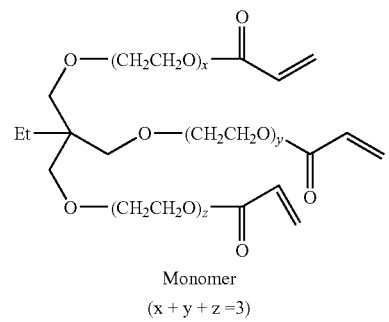

Monomer
(x + y + z = 3)

[Formula 28]

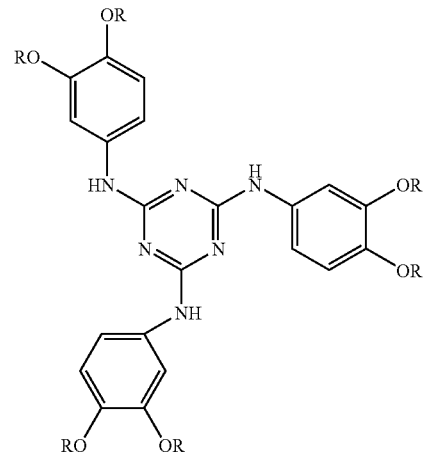

Tilt angle reducing agent used on air interface side

R = $CH_2CH_2OCH_2CH_2C_6F_{13}$

It was found from measurement using an automatic birefringence analyzer (KOBRA-21ADH, trade name, from Oji Scientific Instruments) that thus-prepared retardation film B-1 showed retardation along the thickness direction Rth of 137 nm at a wavelength of 450 nm, and 129 nm at a wavelength of 550 nm, giving a Rth(450 nm)/Rth(550 nm) of 1.06. Retardation in plane Re measured at a wavelength of 550 nm was found to be 1 nm.

A polarizing plate HLC2-2518 from Sanritz Corporation was coated with a pressure sensitive adhesive, and thereon, optically anisotropic film A-2 prepared in Example 2 was transferred so as to adjust an angle between the direction of the slow axis of optically anisotropic film A-2 and the absorption axis of the polarizing plate to 45°, and the polyether ether ketone film used as a substrate was separated. Further thereon, a pressure sensitive adhesive was coated, and retardation film B-1 was bonded.

Except that the stack obtained as described in the above was used on the back light side of the liquid crystal cell, ECB reflective/transmissive-type liquid crystal display device-2 was prepared similarly to as described in Example 3.

Example 5

A commercially-available polyamic acid solution (SE-150, from Nissan Chemical Industries, Ltd.) was diluted with N-methylpyrrolidone so as to adjust the solid matter content to 2% by mass, and filtered through a polypropylene filter having a pore size of 30 μm, and the filtrate was used as a coating liquid for forming alignment layer. On a separately-obtained, back-light-side substrate SB with TFT, having a reflective electrode and the transmissive area, the coating liquid for forming alignment layer obtained in the above was dotted to recesses corresponded to the transmissive area using a piezoelectric head, dried, and then heated at 250° C. for 60 minutes, to thereby form the back-light-side substrate. The thickness of the alignment layer was found to be 0.1 μm. Next, thus-formed alignment layer was rubbed.

The composition prepared in Example 1 was filtered through a polypropylene filter having a pore size of 0.2 μm, and the filtrate was dotted to recesses of the substrate having the alignment layer formed thereon. After the solvent was vaporized off, the resultant film was heated to 130° C. for drying, aligning and ageing, to thereby form a layer having a uniform liquid crystal phase. The film was then cooled to 100° C., and then irradiated with ultraviolet radiation using a ultra-high-pressure mercury lamp (illuminance=200 mW/cm$^2$, energy of irradiation=800 mJ/cm$^2$) in a nitrogen atmosphere having an oxygen concentration of 0.3% or below, so as to fix the state of hybrid alignment, to thereby form optically anisotropic film A-3.

Retardation corresponded to each of the R, G and B pixels was adjusted based on the thickness of the retardation layer, varied by controlling the amount of dotting of the coating liquid of liquid crystal composition.

As for thus-formed optically anisotropic film A-3, axial retardation Re, and retardation Re of the sample inclined by ±40° while assuming the slow axis as the axis of rotation were measured at each wavelength λ corresponded to R, G and B, by the parallel Nicol method using a microscopic spectrometer, and then retardation and the mean tilt angle were calculated. Retardation in plane (Re) of the optically anisotropic film A-3 was found to be 94 nm at a wavelength of 450 nm, 114 nm at a wavelength of 550 nm, and 135 nm at a wavelength of 650 nm. The mean tilt angle was found to be 36° in any wavelength regions.

Except for using thus-prepared substrate as the substrate on the back light side, a reflective/transmissive-type liquid crystal display device-3 was formed similarly to as described in Example 3. In this process, the substrate on the back light side and polarizing plate HLC2-2518 were directly bonded using the pressure sensitive adhesive, without providing any optically anisotropic layer therebetween. Angle between the absorption axis of the polarizing plate and the axis of alignment of the liquid crystal in the liquid crystal cell was found to be 45°.

Example 6

Liquid crystal compound (d) shown below was prepared. Liquid crystal compound (d) may be synthesized similarly according to the synthetic method of exemplary compound (2), except that reagents to be adopted were changed.

[Formula 29]

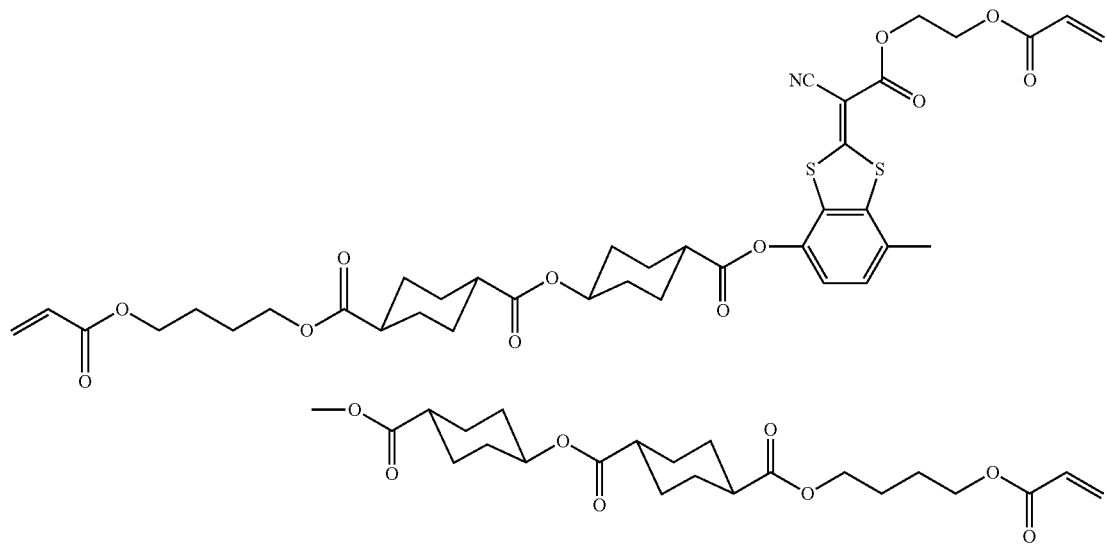

It was found from measurement of the phase transition temperatures that liquid crystalline compound (d) showed a according to the synthetic method of exemplary compound (2), except that reagents to be adopted were changed.

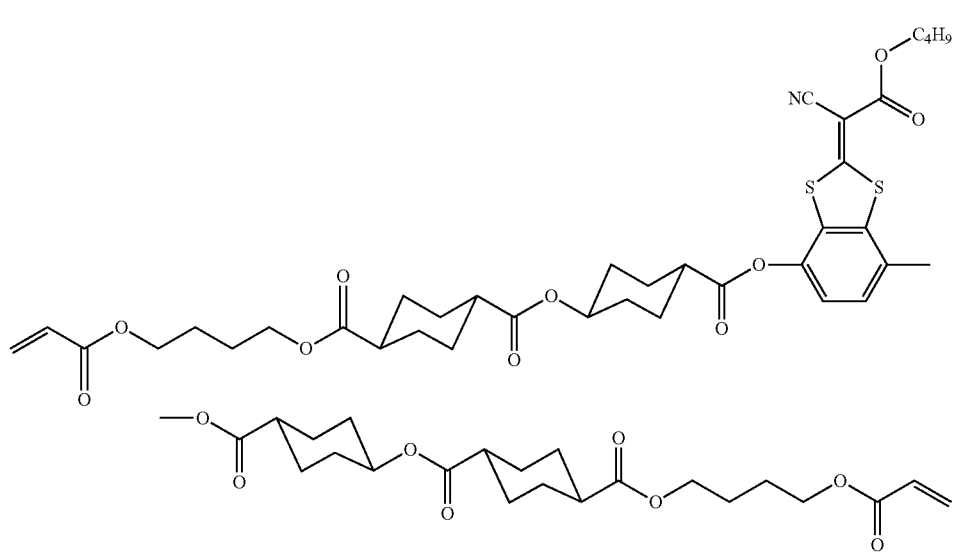

[Formula 30]

melting point of 119° C., showed a nematic (Ne) phase in the process of elevating temperature up to 153° C., and showed a Ne phase in the process of dropping temperature from 153° C. to 80° C. Measurement of wavelength dispersion characteristics of Δn, carried out at 103° C. similarly to as described in the above, gave Δn(450 nm)/Δn(550 nm)=0.85. Liquid crystalline compound (d) was, therefore, confirmed to be a liquid crystal compound which satisfies numerical expression (1) in the above.

A solution, obtained by dissolving 100 parts by mass of liquid crystalline compound (d), 0.1 parts by mass of exemplary compound (AE-3), 0.5 of exemplary compound (PE-4), and 4 parts by mass of a polymerization initiator (Irgacure 819, trade name, from CIBA Specialty Chemicals, Inc.) into 200 parts by mass of methyl ethyl ketone, was coated by bar coating, to thereby prepare a film. Optically anisotropic film A-4 was formed similarly to as described in Example 1, except that the liquid crystal composition was aligned at 120° C., and that the liquid crystal compound was polymerized thereafter by irradiating ultraviolet radiation of 400 mJ/cm² at 90° C. in a nitrogen atmosphere. Optically anisotropic film A-4 was found to be 4.8 μm thick.

Measurement of thus-prepared optically anisotropic film A-4, carried out at each of the individual wavelength similarly to as described in the above, showed that retardation in plane Re was 98 nm at a wavelength of 450 nm, 114 nm at a wavelength of 550 nm, and 122 nm at a wavelength of 650 nm. The mean tilt angle of the liquid crystal molecules in optically anisotropic film A-4, calculated similarly to as described in the above, was found to be 37°.

Except that optically anisotropic film A-4 was used in place of optically anisotropic film A-1, ECB reflective/transmissive-type liquid crystal display device-4 was prepared similarly to as described in Example 3.

Example 7

Liquid crystal compound (e) shown below was prepared. Liquid crystal compound (e) may be synthesized similarly It was found from measurement of the phase transition temperatures that liquid crystalline compound (e) showed a melting point of 147° C., showed a nematic (Ne) phase in the process of elevating temperature up to 163° C., and showed a Ne phase in the process of dropping temperature from 163° C. to 100° C. Measurement of wavelength dispersion characteristics of Δn, carried out at 113° C. similarly to as described in the above, gave Δn(450 nm)/Δn(550 nm)=0.86. Liquid crystalline compound (3) was, therefore, confirmed to be a liquid crystal compound which satisfies numerical expression (1) in the above.

A solution, obtained by dissolving 100 parts by mass of liquid crystalline compound (e), 0.1 parts by mass of exemplary compound (AE-3), 0.5 of exemplary compound (PE-4), and 4 parts by mass of polymerization initiator (trade name: Irgacure 819, from CIBA Specialty Chemicals, Inc.) into 200 parts by mass of methyl ethyl ketone, was coated by bar coating, to thereby prepare a thin film. Optically anisotropic film A-5 was formed similarly to as described in Example 2, except that the liquid crystal composition was aligned at 130° C., and that the liquid crystal compound was polymerized thereafter by irradiating ultraviolet radiation of 400 mJ/cm² at 100° C. in a nitrogen atmosphere. Optically anisotropic film A-5 was found to be 4.60 μm thick.

Measurement of thus-prepared optically anisotropic film A-5, carried out at each of the individual wavelength similarly to as described in the above, showed that Re was 98 nm at a wavelength of 450 nm, 114 nm at a wavelength of 550 nm, and 123 nm at a wavelength of 650 nm. The mean tilt angle of the liquid crystal molecules in optically anisotropic film A-5, calculated similarly to as described in the above, was found to be 35°.

Except that optically anisotropic film A-5 was used in place of optically anisotropic film A-2, ECB reflective/transmissive-type liquid crystal display device-5 was prepared similarly to as described in Example 4.

Example 8

Except that the composition prepared in Example 6 was used, optically anisotropic film A-6 was prepared similarly to as described in Example 5.

Measurement of thus-prepared optically anisotropic film A-6, carried out similarly to as described in the above, showed that retardation in plane Re was 98 nm at a wavelength of 450 nm, 114 nm at a wavelength of 550 nm, and 135 nm at a wavelength of 650 nm. The mean tilt angle of the liquid crystal molecules in optically anisotropic film A-6, calculated similarly to as described in the above, was found to be 37° in any wavelength regions.

By using thus-prepared substrate as the substrate on the back light side, reflective/transmissive-type liquid crystal display device-6 was formed similarly to as described in Example 5.

(Evaluation of Liquid Crystal Display Device)

Transmission brightness of each of thus-prepared reflective/transmissive-type liquid crystal display devices-1 to 6 was measured in a dark room, using a spectroradiometer. The brightness of the liquid crystal display device respectively in the ON-state and OFF-state was observed, while keeping the liquid crystal display device horizontally, setting the polar angle 0 to 60° inclined away from the direction of the normal line at 10° intervals, and varying the azimuth of the liquid crystal display device at 10° intervals at each polar angle, and thereby contrast ratio, which represents ratio of brightness values between the ON-state and OFF-state, was calculated. The values of contrast ratio obtained at all polar angles and azimuths were summed up to find a total, and the total was divided by 211, which is the number of points of measurement, to find an average value to be used as an index of evaluation. Larger average value means larger contrast ratio obtainable over wider range of viewing angle. The viewing angle characteristics of the display device over a wide range of viewing angle may be evaluated by using the index.

Contrast values of the liquid crystal display devices-1 to 6 were found to be 93, 110, 120, 94, 111 and 122, respectively.

Comparative Example 1

A liquid crystal display device was prepared according to procedures similar to those in Example 3, except that a wide-band λ/4 plate, which was prepared by stacking two sheets of conventional stretched film, was disposed between the polarizing plate on the back light side and the substrate, in place of using retardation film 1 having optically anisotropic film A-1. The stretched film disposed closer to the liquid crystal cell has Re of 99 nm at a wavelength of 550 nm, and an azimuth of the slow axis of 212°, and the stretched film disposed closer to the back light has Re of 250 nm and an azimuth of the slow axis of 107°. On the polarizing plate on the back light side, HLC2-2518 was bonded so as to align the axis of absorption thereof in the direction of 43°.

According to the method of evaluation described in the above, the liquid crystal display device was found to have an average value of contrast of as small as 21.

Comparative Example 2

A liquid crystal display device was prepared according to procedures similar to those in Example 3, except that optically anisotropic layer C which is formed according to a method described below and functions as a λ/4 layer, and a stretched film which functions as a λ/2 layer were disposed between the polarizing plate on the back light side and the substrate, according to a configuration adopted to the conventional liquid crystal display device, in place of using retardation film 1 having optically anisotropic film A-1. The azimuth of the slow axis of the λ/4 layer provided closer to the liquid crystal cell was 212° C., and retardation at 550 nm and the azimuth of the slow axis of the λ/2 layer were 250 nm and 107°, respectively. On the polarizing plate on the back light side, HLC2-2518 was bonded so as to align the axis of absorption thereof in the direction of 43°.

<Formation of Optically Anisotropic Layer C>

A substrate made of a cellulose acetate film (Fujitac TD80UF) having a polyvinyl alcohol layer formed thereon as an alignment film was rubbed, and on the rubbed surface, a solution obtained by dissolving 100 parts by mass of the rod-like liquid crystal compound shown below, 0.1 parts by mass of exemplary compound (AE-3), and 3 parts by mass of a polymerization initiator (Irgacure 819) into 350 parts by mass of methyl ethyl ketone was coated by bar coating, allowed to align under heating, and irradiated with ultraviolet radiation of 400 mJ/cm$^2$ at 90° C. The resultant anisotropic layer was found to have axial Re of 109 nm at a wavelength of 450 nm, and 98 nm at a wavelength of 550 nm, and to have the mean tilt angle of 35°. The rod-like liquid crystal compound shown below is a compound exhibiting regular wavelength dispersion of Δn in the visible light region.

[Formula 31]

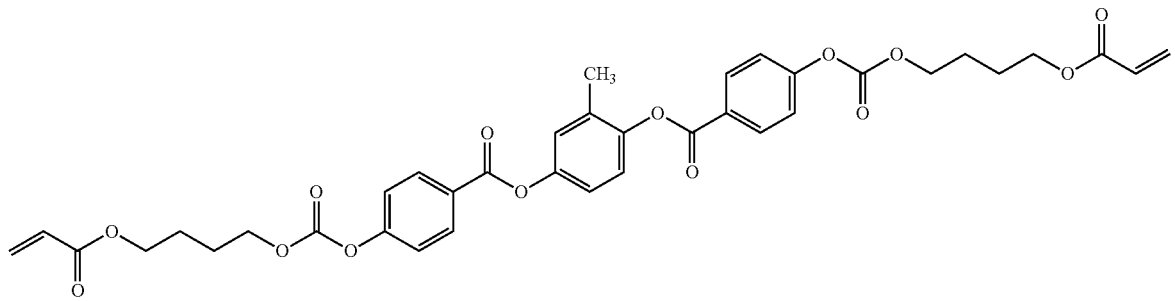

According to the method of evaluation described in the above, the liquid crystal display device was found to have an average value of contrast of 79.

Comparative Example 3

A liquid crystal display device was prepared according to procedures similar to those in Example 3, except that the optically anisotropic film D was formed according to a method described below, in place of forming optically anisotropic film A-1.

<Formation of Optically Anisotropic Film D>

First, a commercially-available cellulose acetate film (Fujitac TD80UF) was saponified, a polyvinyl alcohol solution was coated and dried thereon, to thereby form an alignment film, and the alignment film was rubbed. On the rubbed surface, a solution, obtained by dissolving 100 parts by mass of exemplary compound (2), 0.5 parts by mass of the above-described tilt angle reducing agent used on the air interface side, 10 parts by mass of liquid crystal compound (c), and 4 parts by mass of a polymerization initiator (trade name: Irgacure 819, from CIBA Specialty Chemicals, Inc.), into 350 parts by mass of chloroform, was coated by bar coating, to thereby prepare a thin film. The liquid crystal composition was aligned at 130° C., and was confirmed to give a uniform alignment. The liquid crystal compound was then polymerized by irradiating ultraviolet radiation of 400 mJ/cm$^2$ at 120° C. in a nitrogen atmosphere, and then cooled, to thereby form optically anisotropic layer D which has the state of alignment of the liquid crystal compound fixed therein.

Thus-prepared film (optically anisotropic layer D) was found to have Re of 95 nm at a wavelength of, 113 nm at a wavelength of 550 nm, and 122 nm at a wavelength of 650 nm, and to have the mean tilt angle of 1°.

According to the method of evaluation described in the above, the liquid crystal display device was found to have an average value of contrast of as small as

Figure 1:
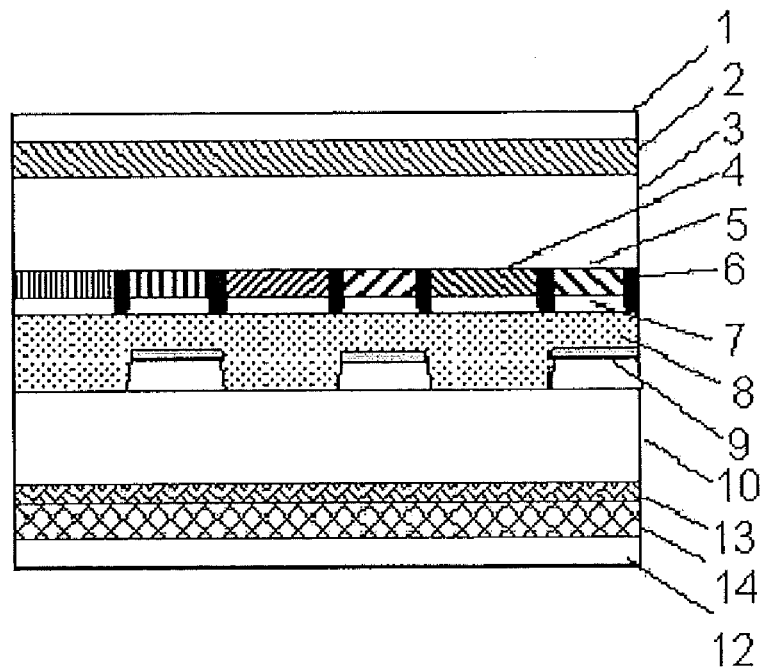
FIG. 1 is a schematic sectional view illustrating an exemplary configuration of a liquid crystal display device of the present invention.
Figure 2:
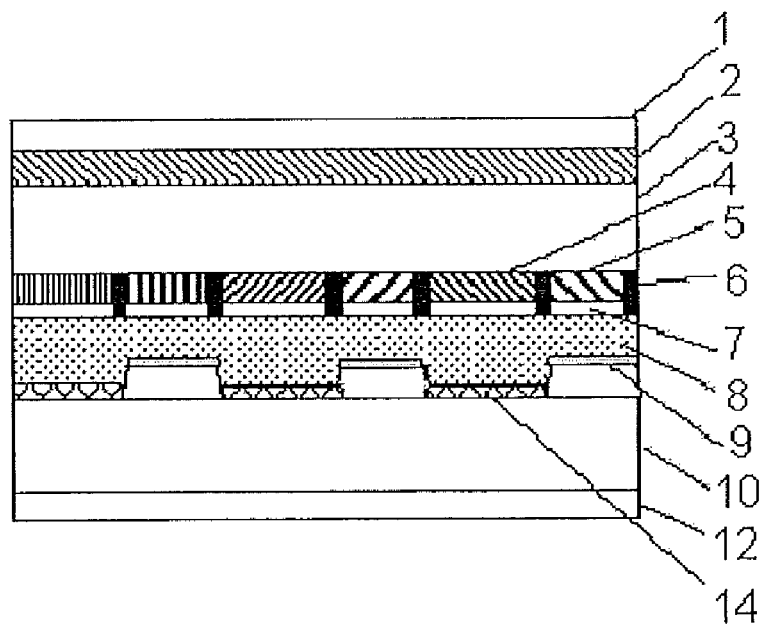
FIG. 2 is a schematic sectional view illustrating another exemplary configuration of a liquid crystal display device of the present invention.

Explanations of Letters or Numerals
  1 polarizing plate on the observer's side
  2 retardation film
  3 substrate
  4 color filter in transmissive area
  5 color filter in reflective area
  6 black matrix
  7 overcoat layer
  8 liquid crystal layer
  9 reflector plate
  10 substrate
  11 retardation film
  12 polarizing plate on the back light side
  13 optically anisotropic layer (B)
  14 optically anisotropic layer (A)

The invention claimed is:

1. An optically anisotropic film comprising at least one species of liquid crystal compound which exhibits a nematic phase or a smectic phase, the liquid crystal phase showing birefringence Δn(λ) at wavelength λ which satisfies the numerical expression (1) below $$\Delta n(450 \text{ nm})/\Delta n(550 \text{ nm}) < 1 \quad (1)$$

wherein molecules of the liquid crystal compound are fixed in a state of tilted alignment in the optically anisotropic film, and wherein the liquid crystal compound is a compound represented by the formula (I) below:

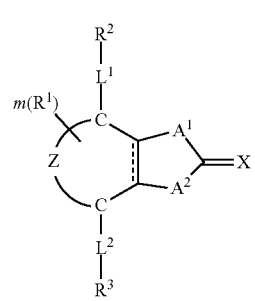

Formula (I)

where, each of A$^1$ and A$^2$ independently represents a group selected from the group consisting of —O—, —NR— (R represents a hydrogen atom or substituent), —S— and —CO—; Z represents one or two atoms selected from the group consisting of carbon atom, and the Group XIV to XVI non-metallic atoms, and forms a five- or six-membered ring together with C—C=C—C or C=C—C=C in the formula; each of R$^1$, R$_2$ and R$^3$ independently represents a substituent; m represents an integer from 0 to 4; each of L$^1$ and L$^2$ independently represents a single bond or divalent linking group; X represents any of the Group XIV to XVI non-metallic atoms, to which a hydrogen atom or substituent R$^4$ may be bound; and at least one of R, R$^1$, R$^2$, R$^3$ and R$^4$ has a polymerizable group.

2. The optically anisotropic film of claim 1, wherein the tilt angles of molecules of the liquid crystal compound on an upper surface and on a lower surface of the film are different from each other; and a mean tilt angle of molecules of the liquid crystal compound is from 5° to 85°.

3. The optically anisotropic film of claim 1, wherein the tilt angles of molecules of the liquid crystal compound on an upper surface and on a lower surface of the film are the same; and a mean tilt angle of molecules of the liquid crystal compound is from 5° to 85°.

4. The optically anisotropic film of claim 1, wherein the compound represented by formula (I) is a compound represented by formula (II) below:

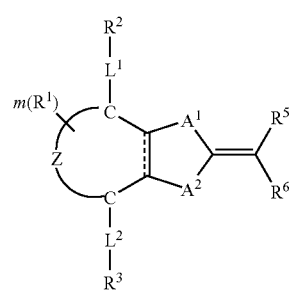

Formula (II)

where, each of A$^1$ and A$^2$ independently represents a group selected from the group consisting of —O—, —NR— (R represents a hydrogen atom or substituent), —S— and —CO—; Z represents one or two atoms selected from the group consisting of carbon atom and the Group XIV to XVI non-metallic atoms, and forms a five- or six-membered ring together with C—C=C—C or C=C—C=C in the formula; each of $R^1$, $R^2$ and $R^3$ independently represents a substituent; m represents an integer from 0 to 4; each of $L^1$ and $L^2$ independently represents a single bond or divalent linking group; each of $R^5$ and $R^6$ independently represents a substituent, and at least one of R, $R^1$, $R^2$, $R^3$, $R^5$ and $R^6$ has a polymerizable group.

5. The optically anisotropic film of claim 1, having retardation in plane, Re, at a wavelength of 550 nm, of 80 to 160 nm.

6. The optically anisotropic film of claim 1, formed by jetting a fluid, which comprises at least the liquid crystal compound, from an ink-jet-type jetting head onto a surface, drying the fluid to form a liquid crystal phase, and by subjecting the resultant film to light exposure.

7. A liquid crystal display device comprising a first optically anisotropic layer which is an optically anisotropic film of claim 1, a back light, a polarizing layer, and a liquid crystal cell which comprises a pair of substrates and a liquid crystal layer held therebetween, and has a reflective area and a transmissive area formed therein.

8. The liquid crystal display device of claim 7, wherein the first optically anisotropic layer is disposed between the polarizing layer and either one of the pair of substrates.

9. The liquid crystal display device of claim 7, wherein the first optically anisotropic layer is disposed between the pair of substrates.

10. The liquid crystal display device of claim 8, further comprising a second optically anisotropic layer having retardation along the thickness direction, Rth, measured at 550 nm of 40 nm to 150 nm, and retardation in plane, Re, measured at 550 nm of 0 nm to 20 nm, wherein
    the second optically anisotropic layer is disposed between the liquid crystal layer and the first optically anisotropic layer, or
    the second optically anisotropic layer is disposed so that the liquid crystal layer is held by the second optically anisotropic layer and the first optically anisotropic layer.

11. The liquid crystal display device of claim 10, wherein Rth of the second optically anisotropic layer shows dependence of regular wavelength dispersion.

12. The liquid crystal display device of claim 7, wherein the liquid crystal layer shows a larger tilt angle in the black state than in the white state.

13. The liquid crystal display device of claim 7, wherein a mean direction of axis of directors of liquid crystal molecules in the liquid crystal layer in the black state, projected onto a plane parallel to the layer, is substantially parallel to the direction of director of molecules of the liquid crystal compound in the first optically anisotropic layer, projected onto the plane parallel to the layer.

* * * * *